United States Patent
Miyazawa

(10) Patent No.: US 11,023,193 B2
(45) Date of Patent: Jun. 1, 2021

(54) PROCESSING APPARATUS, MEDIUM STORING PROGRAM EXECUTABLE BY PROCESSING APPARATUS, AND PRINTING MATERIAL ORDERING SYSTEM

(71) Applicant: BROTHER KOGYO KABUSHIKI KAISHA, Nagoya (JP)

(72) Inventor: Masafumi Miyazawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/716,764

(22) Filed: Dec. 17, 2019

(65) Prior Publication Data
US 2020/0210126 A1 Jul. 2, 2020

(30) Foreign Application Priority Data

Dec. 27, 2018 (JP) .............................. JP2018-244127

(51) Int. Cl.
*G06F 15/00* (2006.01)
*G06F 3/12* (2006.01)
*G06K 1/00* (2006.01)

(52) U.S. Cl.
CPC .......... *G06F 3/1296* (2013.01); *G06F 3/1229* (2013.01)

(58) Field of Classification Search
CPC ............................. G06F 3/1296; G06F 3/1229
USPC .................................. 358/1.15, 1.13, 1.14, 1.1
See application file for complete search history.

(56) References Cited

U.S. PATENT DOCUMENTS

| 5,970,228 A | * | 10/1999 | Nezu | G06F 21/608 |
| | | | | 271/287 |
| 8,654,360 B2 | * | 2/2014 | Hatano | H04N 1/00326 |
| | | | | 358/1.13 |
| 8,911,069 B1 | * | 12/2014 | Novak | B41J 2/17546 |
| | | | | 347/86 |
| 2011/0076036 A1 | | 3/2011 | Hiraike | |
| 2013/0028616 A1 | * | 1/2013 | Kunihiro | G06F 3/1229 |
| | | | | 399/27 |
| 2018/0067706 A1 | * | 3/2018 | Mulloy | G06F 3/121 |
| 2020/0201227 A1 | * | 6/2020 | Sato | G06Q 30/0633 |

FOREIGN PATENT DOCUMENTS

| JP | 2003-015477 A | 1/2003 |
| JP | 2011-090283 A | 5/2011 |

* cited by examiner

*Primary Examiner* — Douglas Q Tran
(74) *Attorney, Agent, or Firm* — Scully Scott Murphy and Presser

(57) ABSTRACT

A processing apparatus for a print unit configured to print an image by using a printing material includes a processor configured to determine a value related to a remaining amount of the printing material in the print unit, output printing material information based on the determined value related to the remaining amount, and determine whether a replenishment printing material is ordered. The processor is configured to determine an order time to order the replenishment printing material by using the value related to the remaining amount of the printing material, and output the printing material information at a shorter interval before the replenishment printing material is ordered than after the replenishment printing material is ordered.

17 Claims, 13 Drawing Sheets

FIRST STATE ST1

SECOND STATE ST2

Fig. 3

FIRST EMBODIMENT
ADMINISTRATION
DATABASE

PD

| | | | | | CYAN INK | | | | | |
|---|---|---|---|---|---|---|---|---|---|---|
| SERIAL NUMBER | MODEL NAME | IP ADDRESS | ORDER FLAG | REMAINING AMOUNT STATE | TIME AND DATE OF RECEIVING | NUMBER OF REPLACEMENTS | INK REMAINING RATIO IR | TIME AND DATE OF RECEIVING | NUMBER OF REPLACEMENTS | INK REMAINING RATIO IR |
| AAABBB | MDL_200 | IP_A | OFF | USUAL | Ta1 | 2 | 90% | Ta2 | 2 | 85% |
| CCCDDD | MDL_250 | IP_B | OFF | LITTLE | Tb1 | 3 | 80% | Tb2 | 3 | 70% |
| GGGHHH | MDL_500 | IP_C | OFF | USUAL | Tc1 | 3 | 30% | Tc2 | 3 | 20% |

EN1, EN2, EN3

| | MAGENTA INK | | |
|---|---|---|---|
| ORDER FLAG | REMAINING AMOUNT STATE | TIME AND DATE OF RECEIVING | NUMBER OF REPLACEMENTS | INK REMAINING RATIO IR |
| OFF | USUAL | Ta3 | 3 | 60% |
| ON | LITTLE | Tb3 | 4 | 10% |
| OFF | USUAL | Tc3 | 2 | 70% |

Fig. 4

| | | | | CYAN INK | | | MAGENTA INK | |
|---|---|---|---|---|---|---|---|---|
| SERIAL NUMBER | MODEL NAME | IP ADDRESS | ORDER STATE | REMAINING AMOUNT STATE | INK REMAINING RATIO IR | ORDER STATE | REMAINING AMOUNT STATE | INK REMAINING RATIO IR |
| AAABBB | MDL_200 | IP_A | NOT DONE | USUAL | 85% | NOT DONE | USUAL | 60% |
| CCCDDD | MDL_250 | IP_B | NOT DONE | USUAL | 70% | DONE | LITTLE | 10% |
| GGGHHH | MDL_500 | IP_C | NOT DONE | USUAL | 20% | NOT DONE | USUAL | 70% |

ADMINISTRATION LIST — ML

L1, L2, L3

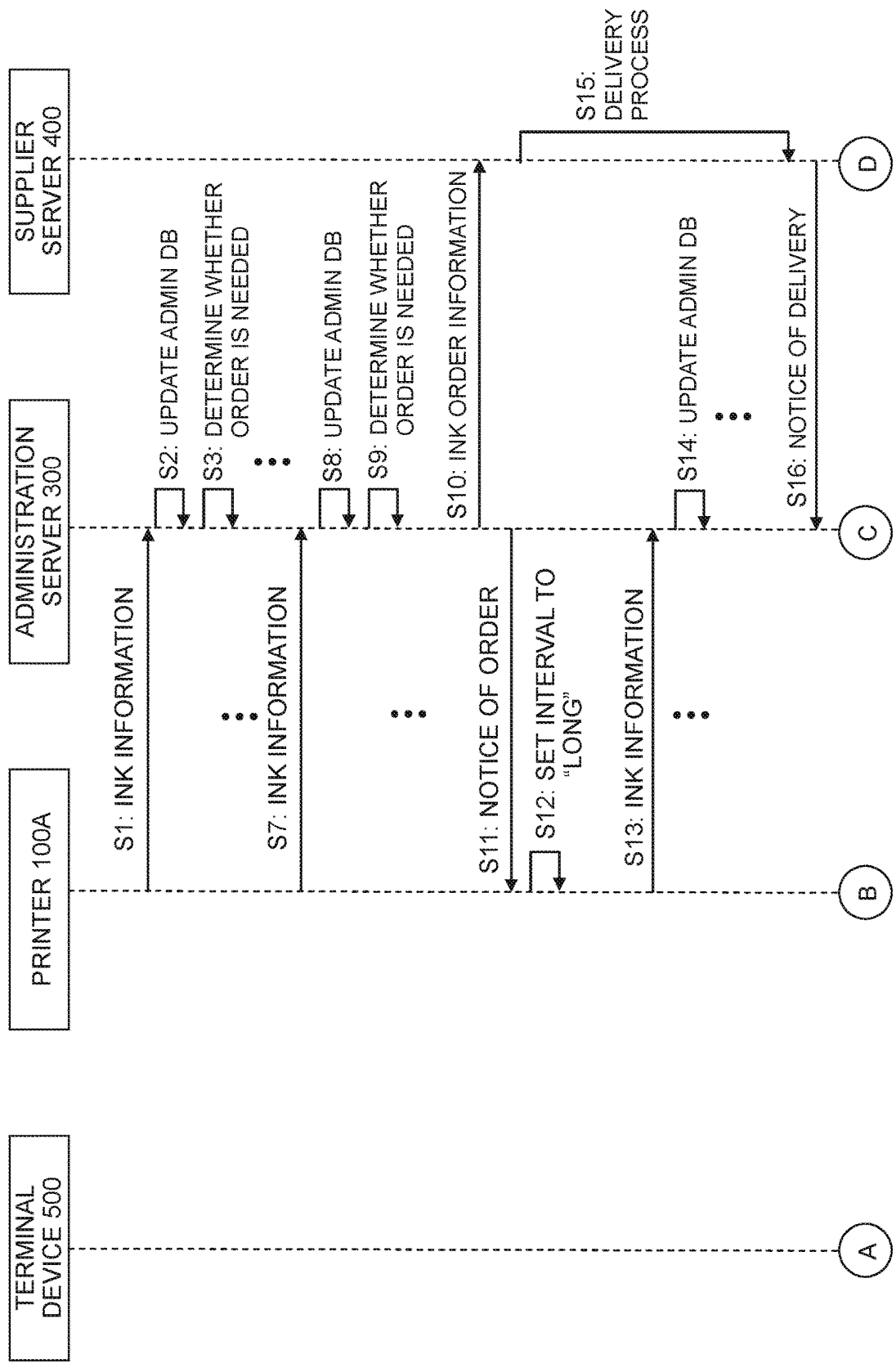

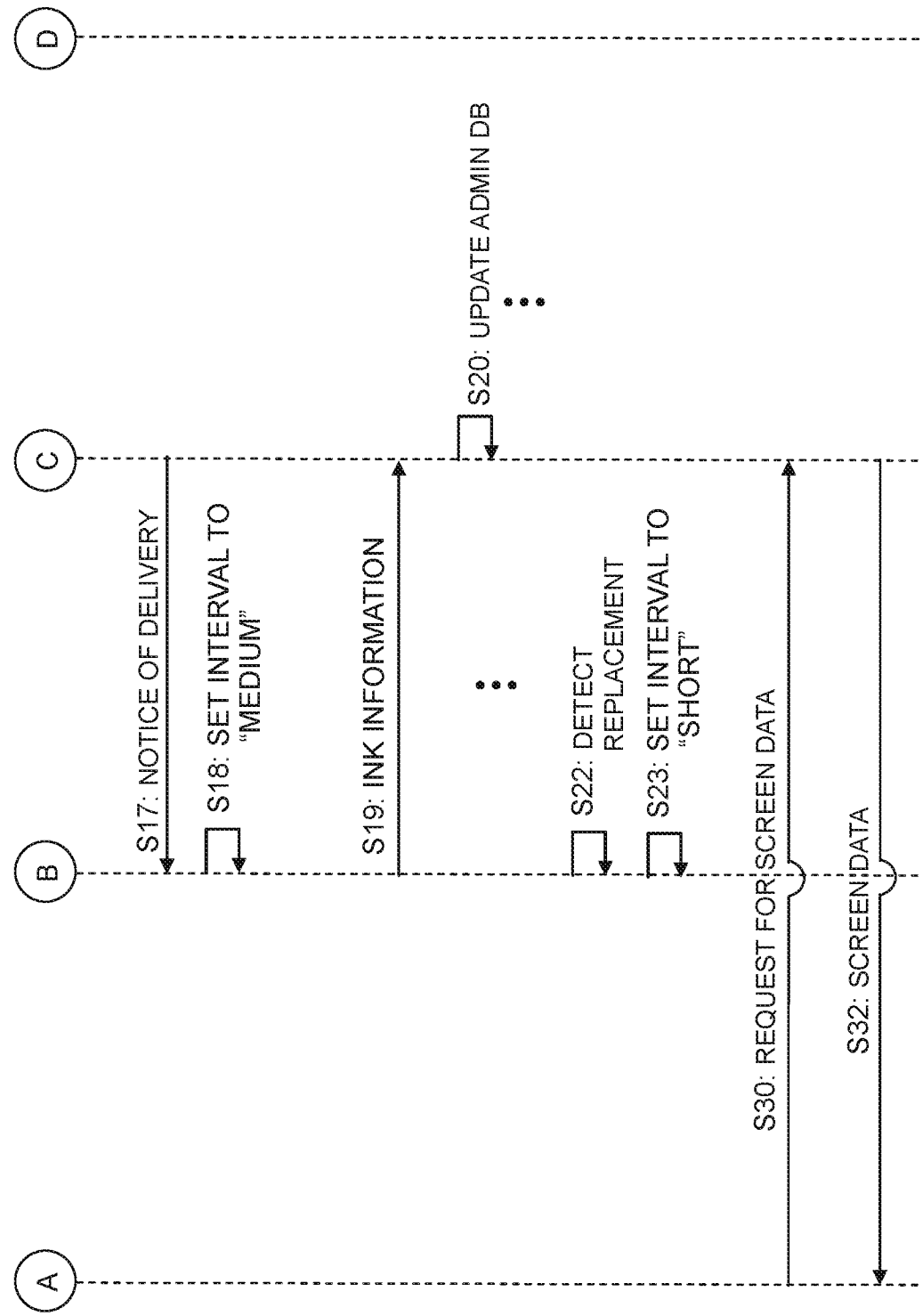

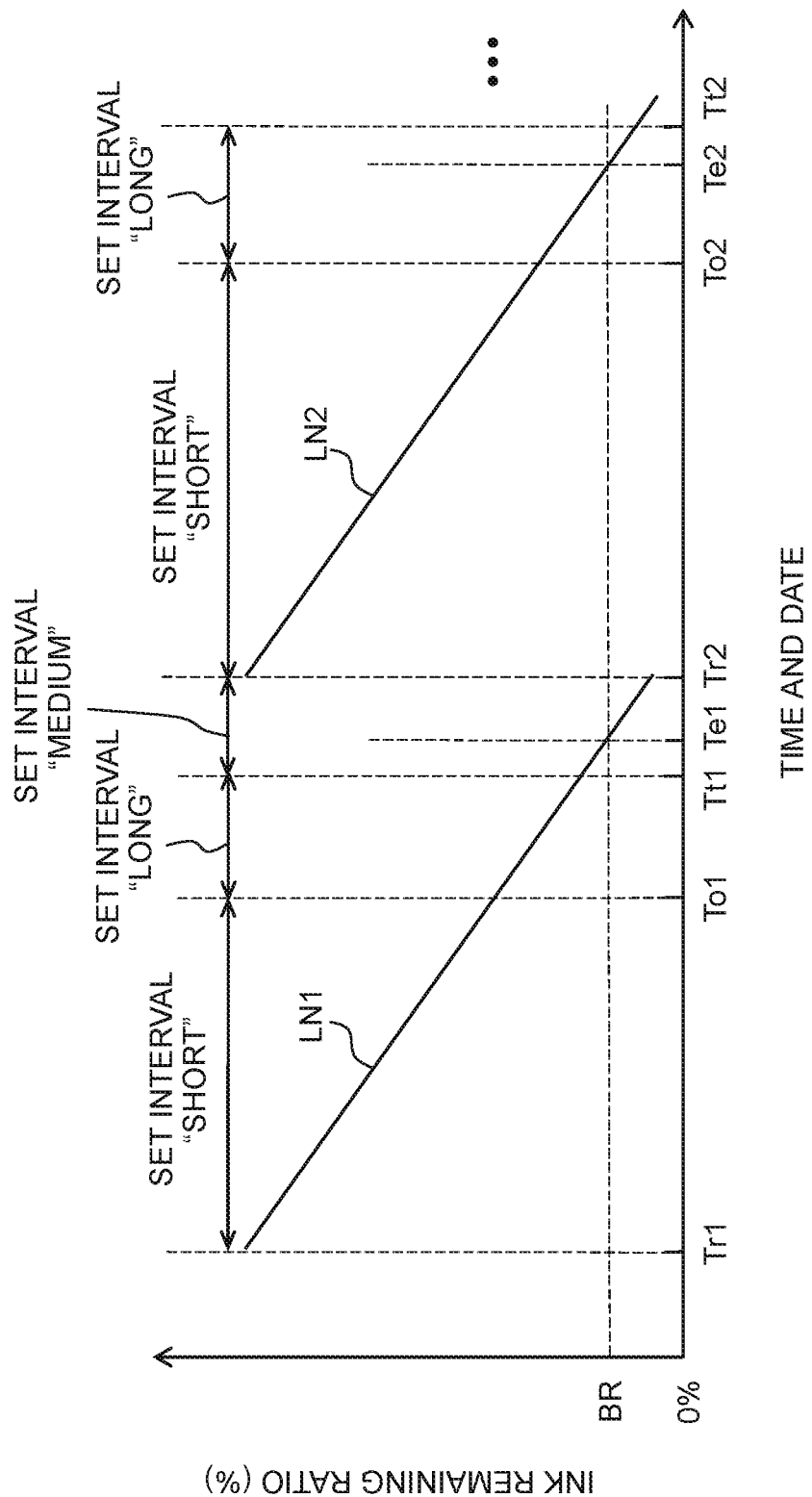

SECOND EMBODIMENT

PROCESSING APPARATUS, MEDIUM STORING PROGRAM EXECUTABLE BY PROCESSING APPARATUS, AND PRINTING MATERIAL ORDERING SYSTEM

CROSS REFERENCE TO RELATED APPLICATION

The present application claims priority from Japanese Patent Application No. 2018-244127, filed on Dec. 27, 2018, the disclosure of which is incorporated herein by reference in its entirety.

BACKGROUND

Field of the Invention

The present specification relates to a technique devised to place an order for a printing material for a print unit to print images.

Description of the Related Art

Japanese Patent Application Laid-open No. 2003-15477 discloses a printer including a processing cartridge. If the days of using the processing cartridge reach a predetermined number of days, then the printer checks the remaining amount of a developer in the processing cartridge and determines an estimated day on which printing is no longer performable with the processing cartridge. The printer determines the day to send an order request signal for the processing cartridge after the estimated day of inability of printing. Then, the printer sends the order request signal on the determined day. By virtue of this, a new processing cartridge will be received on the day when the currently used processing cartridge is estimated as unable for printing. Further, before sending the order request signal, the printer checks the remaining amount of the developer according to each predetermined update period and updates the estimated day of inability of printing.

However, Japanese Patent Application Laid-open No. 2003-15477 has no disclosure at all on whether or not to check the remaining amount of the developer after sending the order request signal.

SUMMARY

An object of the present invention is to provide a technique capable of properly outputting information based on a value related to the remaining amount of a printing material or based on determining the value related to the remaining amount of the printing material, both before and after ordering the printing material to be resupplied (such as an ink or the above developer).

According to an aspect of the present invention, there is provided a processing apparatus for a print unit configured to print an image by using a printing material, the processing apparatus including: a processor configured to: determine a value related to a remaining amount of the printing material in the print unit; output printing material information based on the determined value related to the remaining amount; and judge whether a replenishment printing material to be supplied to the print unit is ordered, wherein the processor is further configured to output the printing material information at a shorter interval before the replenishment printing material is ordered than after the replenishment printing material is ordered.

According to the above configuration, it is possible to appropriately output the information based on the value related to the remaining amount of the printing material both before and after the replenishment printing material is ordered. For example, because the information is outputted at a shorter interval before the replenishment printing material is ordered than after the replenishment printing material is ordered, the order time of the replenishment printing material is determined at a good precision, while needless information of the printing material is restrained from output after the replenishment printing material is ordered.

Note that it is possible to realize the technique disclosed in this specification in various forms. For example, it is possible to realize the technique in the form of a method for administrating a printing material, a system for ordering a printing material, a computer program for realizing the function of such a device and method or a recording medium storing the computer program, etc.

BRIEF DESCRIPTION OF THE DRAWINGS

FIG. 3 shows an example of an administration database.

FIG. 4 shows an example of an administration list.

FIGS. 8A and 8B are a sequence diagram showing an operation of the system according to the first embodiment.

FIG. 9 is a graph for explaining a set interval in the first embodiment.

DESCRIPTION OF THE EMBODIMENTS

[First Embodiment]<Configuration of a System 1000>

Figure 1:
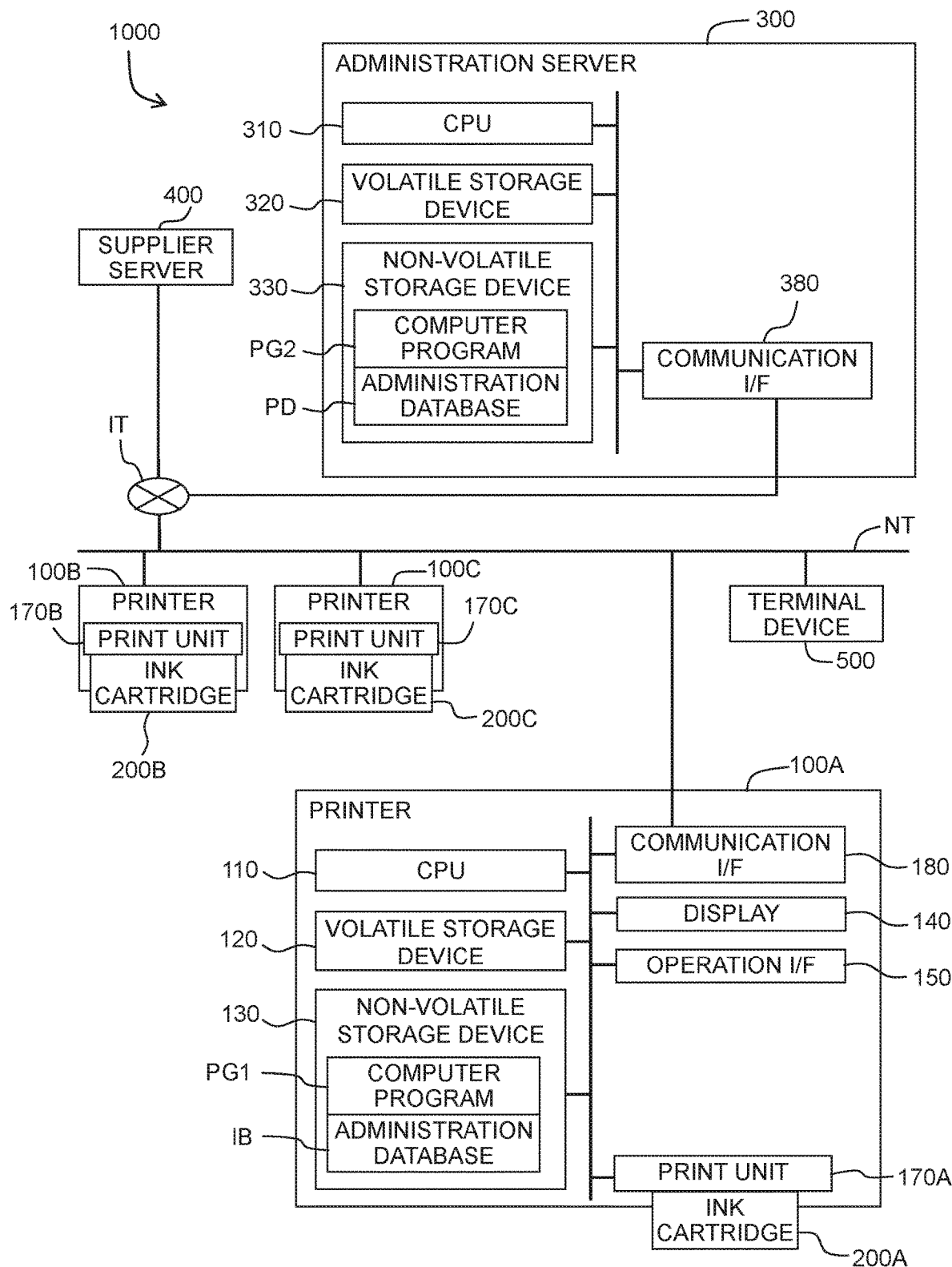
FIG. 1 is a block diagram showing a configuration of a system according to a first embodiment of the present invention.

As shown in FIG. 1, the system 1000 includes a number of printers including printers 100A to 100C, an administration server 300 as an information processing apparatus, a supplier server 400, and a terminal device 500. In order to avoid complication of the figure, FIG. 1 only shows the printers 100A to 100C. The printers 100A to 100C and the terminal device 500 are connected to a local area network NT, and are capable of mutual communication via the local area network NT.

The supplier server 400 and the administration server 300 are connected to the Internet IT. Because the abovementioned local area network NT is also connected to the Internet IT, the supplier server 400 and the administration server 300 are connected with the devices connected to the local area network NT (for example, the terminal device 500 and the printers 100A to 100C) in a communicable manner via the Internet IT.

The supplier server 400 is a server belonging to a business entity operating the system 1000, for example. In an aftermentioned process, the supplier server 400 receives ink order information from the administration server 300.

The terminal device 500 is a computer used by a user of the printers 100A to 100C such as a personal computer or a smartphone. The terminal device 500 can, as will be described in detail later on, access the administration server 300, acquire information about the printers 100A to 100C (such as the remaining amount of ink), and display the information on an unshown display. With that, the user can readily administer the printers 100A to 100C.

The printer 100A includes a CPU 110 as a controller for the printer 100A, a volatile storage device 120 such as DRAM or the like, a non-volatile storage device 130 such as a hard disk, flash memory or the like, a display 140 such as a liquid crystal display or the like for displaying images, an operation interface (I/F) 150 including buttons, a touch panel or the like for acquiring the manipulations of the user, the print unit 170A, and a communication interface (I/F) 180.

The communication I/F 180 is an interface for the connection to the local area network NT. In particular, the communication I/F 180 is a wired interface according to Ethernet (trademark), or a wireless interface according to the version 802.11 of Wi-Fi standard (IEEE: the abbreviation of The Institute of Electrical and Electronics Engineers, Inc.) or another version equivalent to that (such as 802.11a, 11b, 11g, 11n, and the like).

The CPU 110 is a computing device (a processer) for carrying out data processing. The volatile storage device 120 provides a buffer area for temporarily storing various temporary data generated when the CPU 110 carries out a process. The non-volatile storage device 130 stores a computer program PG1 for controlling the printers, and an aftermentioned information database IB.

The computer program PG1 may be prestored in the non-volatile storage device 130 in manufacturing the printer 100A and then provided therefrom, according to the first embodiment. Instead of that, however, the computer program PG1 may be provided in the form of being downloaded from a server connected via the Internet IT, for example, or be recorded in a CD-ROM or the like.

The CPU 110 controls the print unit 170A by executing the computer program PG1 to cause the print unit 170A to carry out a printing process for printing an image. Further, the CPU 110 carries out an aftermentioned ink related process by executing the computer program PG1.

Figure 2A:
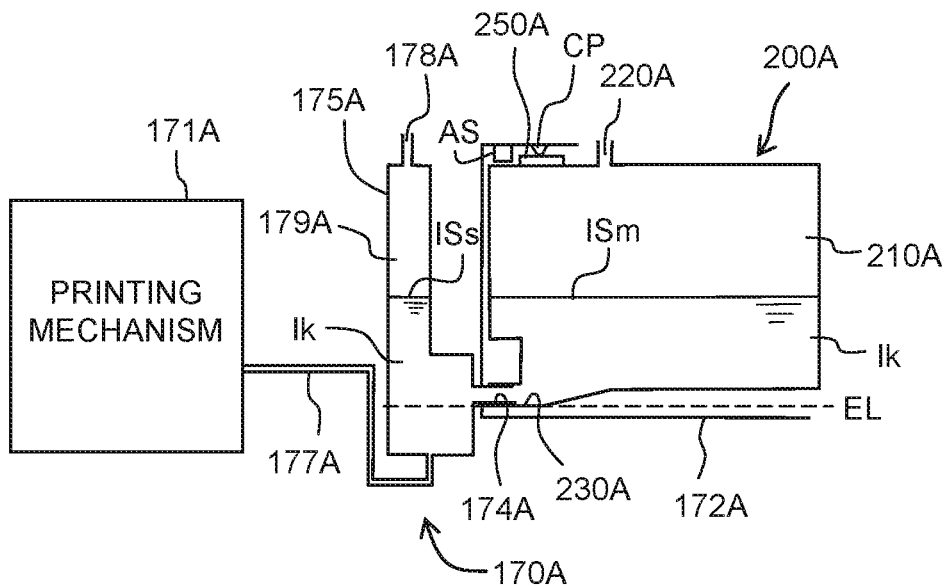
FIGS. 2A and 2B are schematic diagrams of a configuration of a print unit.
Figure 2B:
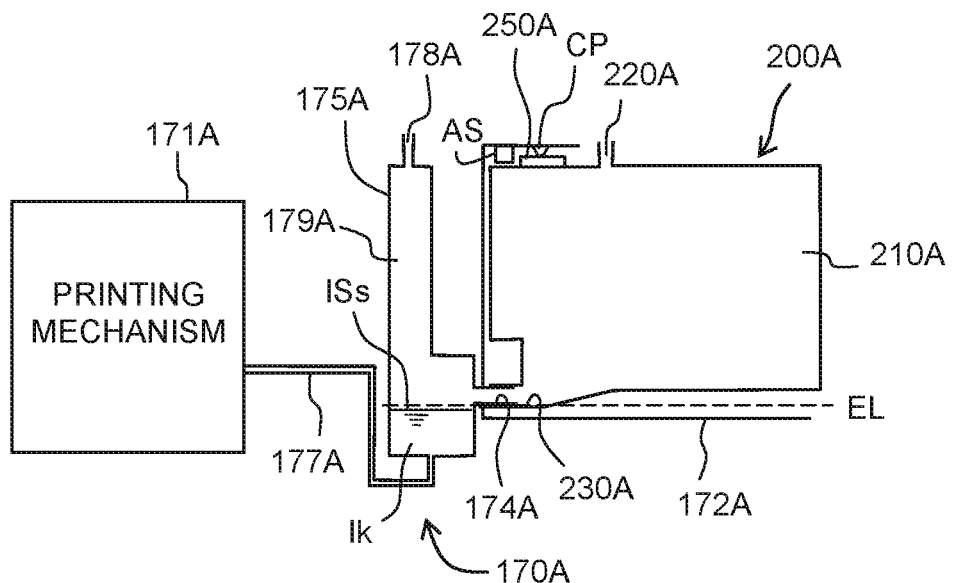

The print unit 170A carries out printing under the control of the CPU 110. As shown in FIGS. 2A and 2B, the print unit 170A includes a printing mechanism 171A, an installation unit 172A, an ink supply port 174A, an intermediate container 175A, and an ink flow unit 177A.

The printing mechanism 171A is a printing mechanism of the ink jet type for printing the image on printing paper as a printing medium, using the ink as a printing material supplied from an ink cartridge 200A. In particular, the printing mechanism 171A jets the ink from nozzles of an unshown printing head to form dots on the paper, so as to print the image on the paper. In the first embodiment, the printing mechanism 171A is a printing mechanism using inks Ik in different colors, such as a printing mechanism for printing a color image, using the inks Ik of four colors: cyan (C), magenta (M), yellow (Y), and black (K). In order to avoid complication of the figure, FIG. 2 shows the installation unit 172A, the ink supply port 174A, the intermediate container 175A, and the ink flow unit 177A for the ink Ik of one color. In reality, for each of the four color inks Ik, the print unit 170A includes one installation unit 172A, one ink supply port 174A, one intermediate container 175A, and one ink flow unit 177A. Then, in the four installation units 172A of the print unit 170A, there are installed four ink cartridges 200A corresponding respectively to the four color inks Ik.

The ink cartridge 200A is formed with a main container chamber 210A containing the ink Ik, a communication port 220A, and an ink exit 230A. The communication port 220A is an opening for the communication between the main container chamber 210A and the atmosphere. The ink exit 230A is an opening for supplying the ink Ik in the main container chamber 210A to the print unit 170A. The ink exit 230A is provided in the vicinity of the lower end of the main container chamber 210A in the vertical direction such that all the ink Ik in the main container chamber 210A can be supplied to the print unit 170A.

An IC chip 250A is fitted on the outside of the ink cartridge 200A. The IC chip 250A has a memory storing various kinds of information about the ink cartridge 200A. In the first embodiment, the information stored in the memory of the IC chip 250A includes information showing the initial ink amount IV which is the ink Ik amount contained in any new ink cartridge 200A, and identification information (such as a serial number) for identifying the ink cartridge 200A.

The installation unit 172A is, for example, a holder capable of installing the ink cartridge 200A in a removable manner. The ink supply port 174A is in communication with the ink exit 230A of the ink cartridge 200A installed in the installation unit 172A. The ink Ik in the main container chamber 210A is supplied from the ink supply port 174A to the print unit 170A. The installation unit 172A is provided with a contact point CP in contact with an electrode of the IC chip 250A of the ink cartridge 200A installed in the installation unit 172A. Via the contact point CP, the printer 100A (the CPU 110) can read out the information stored in the memory of the IC chip 250A and can write information into the memory.

An installation sensor AS is installed in the installation unit 172A to detect whether or not the ink cartridge 200A is installed in the installation unit 172A. For example, the installation sensor AS includes a light emitting portion for emitting light and a light receiving portion for receiving the light. If the ink cartridge 200A is installed in the installation unit 172A, then a rib (not shown) formed on the casing of the ink cartridge 200A is disposed to block the light from the light emitting portion to the light receiving portion. The light receiving portion of the installation sensor AS outputs an electric signal to the CPU 110 to indicate whether or not the light is received. The electric signal indicating that the light is received is a signal showing that the ink cartridge 200A is not installed (also to be referred to as non-installation signal). The electric signal indicating that the light is not received is a signal showing that the ink cartridge 200A is installed (also to be referred to as installation signal). It is possible to adopt various other configurations for the installation sensor AS such as a configuration of detecting the contact between the contact point CP and the electrode of the IC chip 250A.

The intermediate container 175A is formed with a sub-container chamber 179A containing the ink Ik, and a communication port 178A. The communication port 178A is an opening for the communication between the sub-container chamber 179A and the atmosphere. The sub-container chamber 179A is in communication with the ink supply port 174A, and retains the ink supplied from the ink cartridge 200A via the ink supply port 174A.

The upstream end of the ink flow unit 177A is connected to the vicinity of the bottom of the sub-container chamber 179A of the intermediate container 175A to communicate with the sub-container chamber 179A. The downstream end of the ink flow unit 177A is connected to an unshown printing head of the printing mechanism 171A. By virtue of this, the ink Ik in the sub-container chamber 179A is supplied to the printing mechanism 171A via the ink flow unit 177A.

As is understood from the above explanation, the intermediate container 175A is arranged in the flowing passage of the ink & from the ink cartridge 200A installed in the installation unit 172A to the printing mechanism 171A.

Here, as with the print unit 170A, the term "dual-chamber supply method" is used to refer to the method for supplying the ink Ik by the type of including an intermediate container in the passage of the ink Ik from an ink cartridge to the printing mechanism. FIG. 2A shows the print unit 170A in a first state ST1. In the first state ST1, the ink Ik remains not only in the ink cartridge 200A (in the main container chamber 210A) but also in the intermediate container 175A (in the sub-container chamber 179A). FIG. 2B shows the print unit 170A in a second state ST2. In the second state ST2, the ink Ik remains in the intermediate container 175A (in the sub-container chamber 179A) but does not remain in the ink cartridge 200A (in the main container chamber 210A).

The main container chamber 210A of the ink cartridge 200A is in communication with the outside through the communication port 220A, while the sub-container chamber 179A of the intermediate container 175A is in communication with the outside through the communication port 178A. Then, the sub-container chamber 179A of the intermediate container 175A includes a part positioned below the vertical lower end (also to be simply referred to below as "lower end") of the main container chamber 210A of the ink cartridge 200A (on the lower side of FIG. 2), and a part positioned above the lower end of the main container chamber 210A. Therefore, if a new ink cartridge 200A is installed, then part of the ink Ik in the ink cartridge 200A will move into the sub-container chamber 179A from the ink supply port 174A. Then, a liquid level ISm of the ink Ik in the main container chamber 210A will become equal in height to a liquid level ISs of the ink Ik in the sub-container chamber 179A (FIG. 2A).

If the ink Ik is consumed due to the printing carried out by the printing mechanism 171A, then the two liquid levels Ism and ISs keep equal in height but decrease in height. Then, if the liquid levels Ism and ISs come down to a position EL (also to be referred to as empty level EL) of the lower end of the main container chamber 210A of the ink cartridge 200A, then no ink Ik remains in the main container chamber 210A of the ink cartridge 200A such that the remaining state of the ink Ik transits from the first state ST1 (FIG. 2A) to the second state ST2 (FIG. 2B). Here, the state of no ink Ik remaining in the main container chamber 210A of the ink cartridge 200A means the state where there is no movement of the ink Ik from the main container chamber 210A to the sub-container chamber 179A, but also includes the state where there is more or less of the ink Ik adhering to the inner wall of the main container chamber 210A.

After the transition to the second state ST2, as long as the sub-container chamber 179A has the remaining ink Ik, the printing mechanism 171A can continue printing. Therefore, after the transition to the second state ST2, it is possible to replace the ink cartridge 200A anytime without wasting the ink Ik. Hence, the dual-chamber supply method has such an advantage that it is possible to replace the ink cartridge 200A without wasting the ink Ik.

Here, the term "boundary ink amount BY" is used to refer to the ink amount corresponding to the boundary between the first state ST1 and the second state ST2. The boundary ink amount BV in the first embodiment can also be regarded as the ink amount in the sub-container chamber 179A when the liquid level ISs is positioned at the empty level EL in the sub-container chamber 179A. Further, the boundary ink amount BV can be regarded as the maximum ink amount in the second state ST2. Further, the boundary ink amount BV is equal to the volume of such a part of the sub-container chamber 179A as positioned right below the lower end of the main container chamber 210A. The boundary ink amount BV is a value which can be different according to the type of the printer 100A.

The information database IB of the printer 100A stores printer information about the printer 100A. The printer information of the printer 100A includes, for example, information showing a serial number and a model name The model name is identification information indicating the type of the printer 100A, and is also referred to as type code, model code or the like. The printer information includes, for example, ink information about the ink Ik, and history information about the history of printing. The ink information includes, for example, the aforementioned boundary ink amount BV, the serial number of each of the ink cartridges 200A of CYMK, the initial ink amount IV, and an ink remaining amount RV.

The printer 100A (the CPU 110) keeps the printer information stored in the information database IB to the latest by updating the history information and the ink information stored in the information database IB each time printing is carried out, for example. The initial ink amount IV is, for example, acquired from the memory of the IC chip 250A of the ink cartridge 200A. The printer 100A records the sum of the initial ink amount IV and the remaining amount of the ink Ik of the intermediate container 175A into the information database IB as the ink remaining amount RV at each point of time of replacing the cartridge, for example. The printer 100A calculates the used amount of the ink Ik on each occasion of carrying out printing. Then, the printer 100A subtracts the used amount from the ink remaining amount RV before the printing is carried out, so as to calculate the ink remaining amount RV after the printing is carried out. The printer 100A updates the ink remaining amount RV recorded in the information database IB to the ink remaining amount RV after the printing is carried out on each occasion of carrying out printing.

The printers 100B and 100C, the print units 170B and 170C and the ink cartridges 200B and 200C have the same configurations as the printer 100A, the print unit 170A and the ink cartridge 200A described above, respectively.

The administration server 300 is a server operated by a business entity (such as the manufacturer of the printers 100A to 100C) in charge of the system 1000. The administration server 300 is a computer, including a CPU 310 as a controller for the administration server 300, a volatile storage device 320 such as DRAM or the like, a non-volatile storage device 330 such as a hard disk, flash memory or the like, and a communication interface (I/F) 380.

The communication I/F 380 is connected to the local area network NT. As with the communication I/F 180, the communication I/F 380 is a wired interface according to Ethernet (trademark), or a wireless interface according to the Wi-Fi standard or another equivalent standard.

The CPU 310 is a computing device (a processer) for carrying out data processing. The volatile storage device 320 provides a buffer area for temporarily storing various temporary data generated when the CPU 310 carries out a process. The non-volatile storage device 330 stores a computer program PG2 and an administration database PD.

The computer program PG2 is provided in the form of being uploaded by the business entity in charge of the system 1000, for example. Instead of that, the computer program PG2 may be provided in the form of being recorded in a CD-ROM or the like, or be provided by being prestored in the non-volatile storage device 330 in manufacturing the administration server 300.

The administration server 300 (the CPU 310) executes the computer program PG2 to carry out an ink administration process related to the administration of a number of printers including the printers 100A to 100C in the aftermentioned system 1000.

The administration database PD records the printer information collected by the administration server 300. As shown in FIG. 3, the administration database PD includes entries corresponding respectively to the printers in the system 1000 which is an administrating target. FIG. 3 only shows entries EN1 to EN3 as the representatives, corresponding respectively to the printers 100A to 100C.

As shown in FIG. 3, the entry EN1 of the printer 100A includes a number of items of the printer information as follows in particular: the serial number, the model name, and the IP address. The entry EN1 further includes the ink information of each of the four color inks Ik of CMYK as follows in particular: the number of replacements, the ink remaining ratio IR, the order flag, and the state of remaining amount. The number of replacements and the ink remaining ratio IR are the ink information sent periodically from each printer. Therefore, one entry EN1 records numbers of replacements and ink remaining ratios IR associated respectively with the times and dates when the information is received.

The serial number is identification information for identifying the printer 100A. The model name shows the type of the printer 100A. The IP address is assigned to the printer 100A.

The number of replacements is the times of replacing the ink cartridge 200A in the printer 100A, from the beginning of operating the system 1000 up to now.

The ink remaining ratio IR is a value showing the ratio of the amount of the ink Ik remaining in the ink cartridge 200A and the intermediate container 175A. In the first embodiment, the ink remaining ratio IR is the ratio (in percentages in the first embodiment) of the current ink remaining amount RV to the sum of the initial ink amount IV and the boundary ink amount BV of the ink cartridge 200A. It is possible to refer to the ink remaining ratio IR as an index value for the ink remaining amount.

The order flag is turned "ON" if an order of the ink cartridge 200A is placed for the next use to the current use of the ink cartridge 200A in the printer 100A, and turned "OFF" when the order has not yet placed.

The remaining state takes the value of either "usual" corresponding to the abovementioned first state ST1 or "little" corresponding to the second state ST2.

The entry EN2 and entry EN3 corresponding to the printer 100B and the printer 100C include information showing the same items as the entry EN1 corresponding to the printer 100A, respectively.

In the first embodiment, the administration database PD records the printer information in which for example these items are sent to the administration server 300 from each printer at the beginning of operating the system 1000: the serial number, the model name, the IP address, the supply method, and the boundary ink amount BY. The administration server 300 registers each printer as an administering target by recording those items of the information in the administration database PD.

The ink information in the printer information recorded in the administration database PD is acquired respectively from the printers as the administering targets in the ink administration process which will be described later on.

<Operation of the System 1000>
<Printer Information Display Process>

The administration server 300 carries out a printer information display process as one of the processes for administering the printers as the administering targets. The printer information display process is designed to send screen data to the terminal device 500 for displaying an administration list ML according to the access from the terminal device 500. The administration list ML includes information about the printers as the administering targets. For example, the screen data conform to the web page format (such as an HTML (Hyper Text Markup Language) file). The administration server 300 functions as an HTTP server providing the screen data to clients according to the web page format. Via a web browser, the terminal device 500 sends an HTTP request for the data screen to the administration server 300, and receives the screen data as the replay to the HTTP request. The terminal device 500 displays on an unshown display the administration list ML shown by the screen data.

As shown in FIG. 4, the administration list ML is a list generated on the basis of the administration database PD for the view of the printer information of the printers 100A to 100C of the administering targets. The administration list ML includes three lines L1 to L3 corresponding respectively to the printers 100A to 100C of the administering targets. The lines L1 to L3 show the printer information included in the corresponding entries EN1 to EN2 in the administration database PD. The user of the printers 100A to 100C can easily confirm the printer information of the printers 100A to 100C of the administering targets by causing the terminal device 500 to display the administration list ML.

<Ink Related Process>

The printers 100A to 100C carry out the ink related process to send the ink information to the administration server 300, respectively. The ink related process is constantly carried out during the period when the printers 100A to 100C are powered. The ink information sent to the administration server 300 is used for updating the administration database PD and ordering a cartridge for replacement in the ink administration process (FIG. 6) carried out by the administration server 300. While the following explanation will be made on the case where the printer 100A carries out the relative process, the printers 100B and 100C carry out the ink related process in the same manner.

Figure 5:
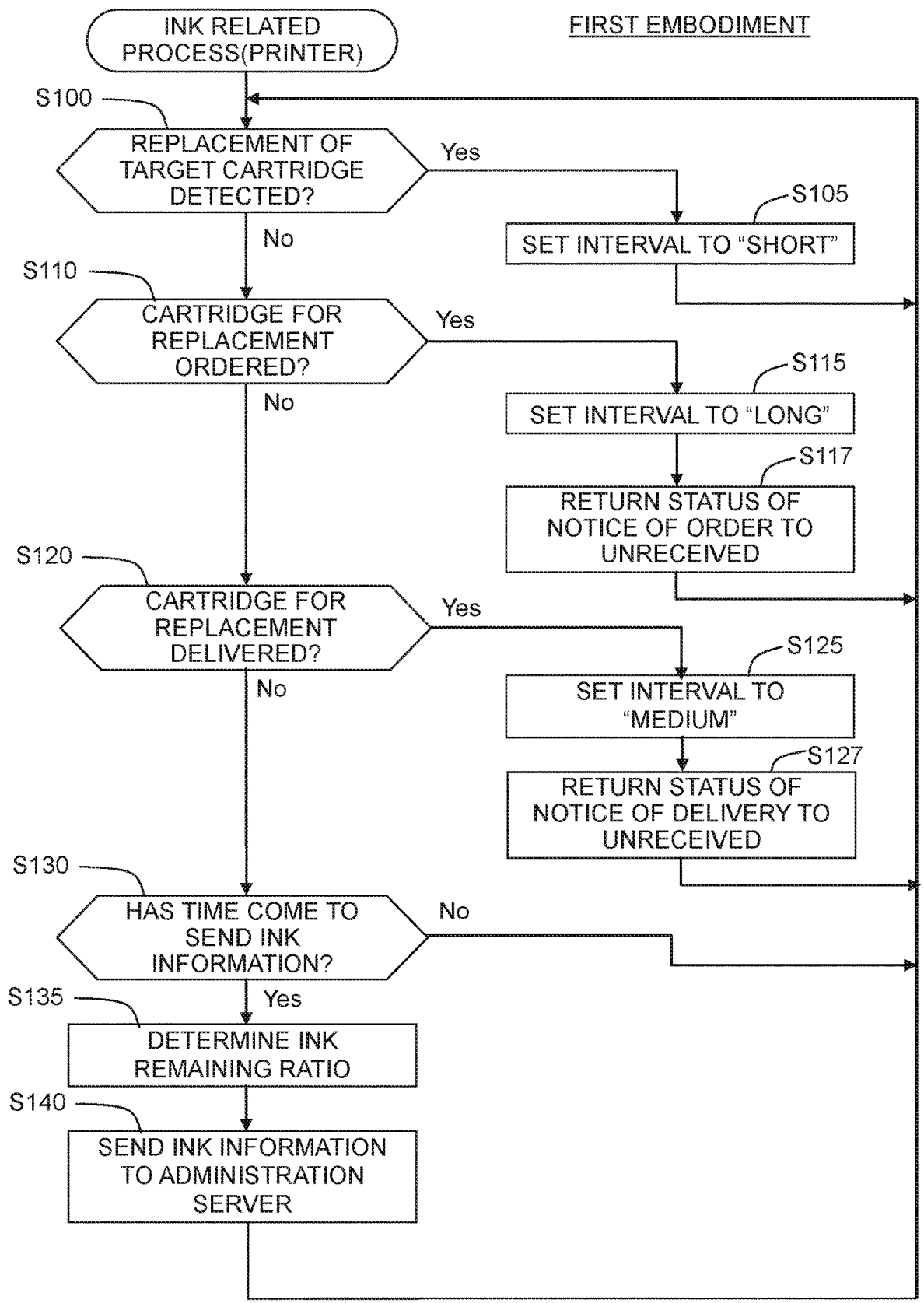
FIG. 5 is a flow chart of an ink related process according to the first embodiment.

As shown in FIG. 5, the ink related process is carried out independently with each of the CMYK cartridges as the target. In the step S100, the CPU 110 of the printer 100A determines whether or not replacement of the target ink cartridge 200A (to be referred below as target cartridge) is detected. In particular, the CPU 110 determines that the target cartridge is removed if it detects that an electric signal outputted by the installation sensor AS for the target cartridge has transited from an installation signal to a non-installation signal. After the target cartridge is removed, the CPU 110 determines that the target cartridge is installed if it detects that the electric signal outputted by the installation sensor AS has transited from the non-installation signal to the installation signal. After determining the target cartridge is installed, the CPU 110 compares the serial number of the target cartridge recorded in the information database IB with such a serial number of the target cartridge newly installed as recorded in the IC chip 250A. If the two serial numbers are different, then at that point of time, the CPU 110 detects that the old target cartridge is replaced by the new one.

If the CPU 110 detects that the target cartridge is replaced (S100: Yes), then in the step S105, the CPU 110 sets "short" for the interval of a set time (to be referred to below as set interval) for carrying out determination and transmission of the ink information, and then returns the process to the step S100. The set interval of "short" may be one day, for example.

If the CPU 110 has not detected that the target cartridge is replaced (S100: No), then in the step S110, the CPU 110 determines whether or not the order is placed for the ink cartridge 200A for replacement (to be referred to below as cartridge for replacement) to be installed next to the target cartridge now installed. The cartridge for replacement contains the printing material (the ink Ik) to be resupplied to the print unit 170A. The administration server 300 sends the order of the cartridge for replacement to the supplier server 400 in the aftermentioned ink administration process. For the order of the cartridge for replacement, the administration server 300 sends a notice of order to the printer 100A. In this step, the CPU 110 determines whether or not the printer 100A has received that notice of order and, if the notice of order is received, then the CPU 110 determines that the cartridge for replacement is ordered.

If the cartridge for replacement is ordered (S110: Yes), then in the step S115, the CPU 110 sets "long" for the aforementioned set interval. The set interval of "long" is three days, for example.

In the step S117, the CPU 110 returns the status of receiving the notice of order of the cartridge for replacement to that of being unreceived, and returns the process to the step S110. That is, thereafter, the notice of order stays in the unreceived status until the next notice of order is received.

If the cartridge for replacement is not yet ordered (S110: No), then in the step S120, the CPU 110 determines whether or not the cartridge for replacement is delivered. If the cartridge for replacement is ordered for the supplier server 400, then the cartridge for replacement is delivered by the business entity operating the supplier server 400. If the business entity confirms that the cartridge for replacement is delivered to the user, then it inputs that fact to the supplier server 400. If the fact that the cartridge for replacement is delivered to the user is inputted, then the supplier server 400 sends a notice of delivery to the administration server 300. If the administration server 300 receives the notice of delivery from the supplier server 400, then it sends the notice of delivery to the printer 100A. In this step, the CPU 110 determines whether or not the printer 100A has received the notice of delivery and, if the notice of delivery is received, then it determines that the cartridge for replacement is finished with delivery. Note that in a modified embodiment, the notice of delivery may be directly sent to the printer 100A from the supplier server 400.

If the cartridge for replacement is delivered (S120: Yes), then in the step S125, the CPU 110 sets "medium" for the aforementioned set interval. The set interval of "medium" is two days, for example.

In the step S127, the CPU 110 returns the status of receiving the notice of delivery of the cartridge for replacement to that of being unreceived, and returns the process to the step S110. That is, thereafter, the notice of delivery stays in the unreceived status until the next notice of delivery is received.

If the cartridge for replacement is not yet delivered (S120: No), then in the step S130, the CPU 110 determines whether or not such a time has come as to send or transmit the ink information to the administration server 300 (the transmission time). In particular, the CPU 110 determines that the transmission time has come if the set interval set currently has elapsed since the previous transmission time of the ink information.

If the transmission time of the ink information has come (S130: Yes), then in the step S135, the CPU 110 determines the current ink remaining ratio IR of the target cartridge. In particular, the CPU 110 refers to the information database IB to acquire the initial ink amount IV of the target cartridge, the boundary ink amount BV of the target cartridge, and the ink remaining amount RV of the target cartridge, and then calculate the ink remaining ratio IR.

In the step S140, the CPU 110 sends the ink information including the determined ink remaining ratio IR to the administration server 300 and then returns the process to the step S100. The transmitted ink information includes not only the ink remaining ratio IR but also, for example, the number of replacements, information for determining the transmitter printer (such as the printer 100A), and information for determining the target cartridge. The information for determining the transmitter printer is, for example, the aforementioned model name and the serial number of the printer. The information for determining the target cartridge is, for example, the aforementioned serial number of the target cartridge.

If the transmission time of the ink information has not yet come (S130: No), then the CPU 110 does not carry out the steps S135 and S140 but returns the process to the step S100.

<Ink Administration Process>

The administration server 300 constantly carries out the ink administration process as one of the processes for administering the printers of the administering targets. The ink administration process is carried out for ordering the cartridge for replacement along with updating the administration database PD based on the ink information received from the printer of an administering target (such as the printer 100A).

Figure 6:
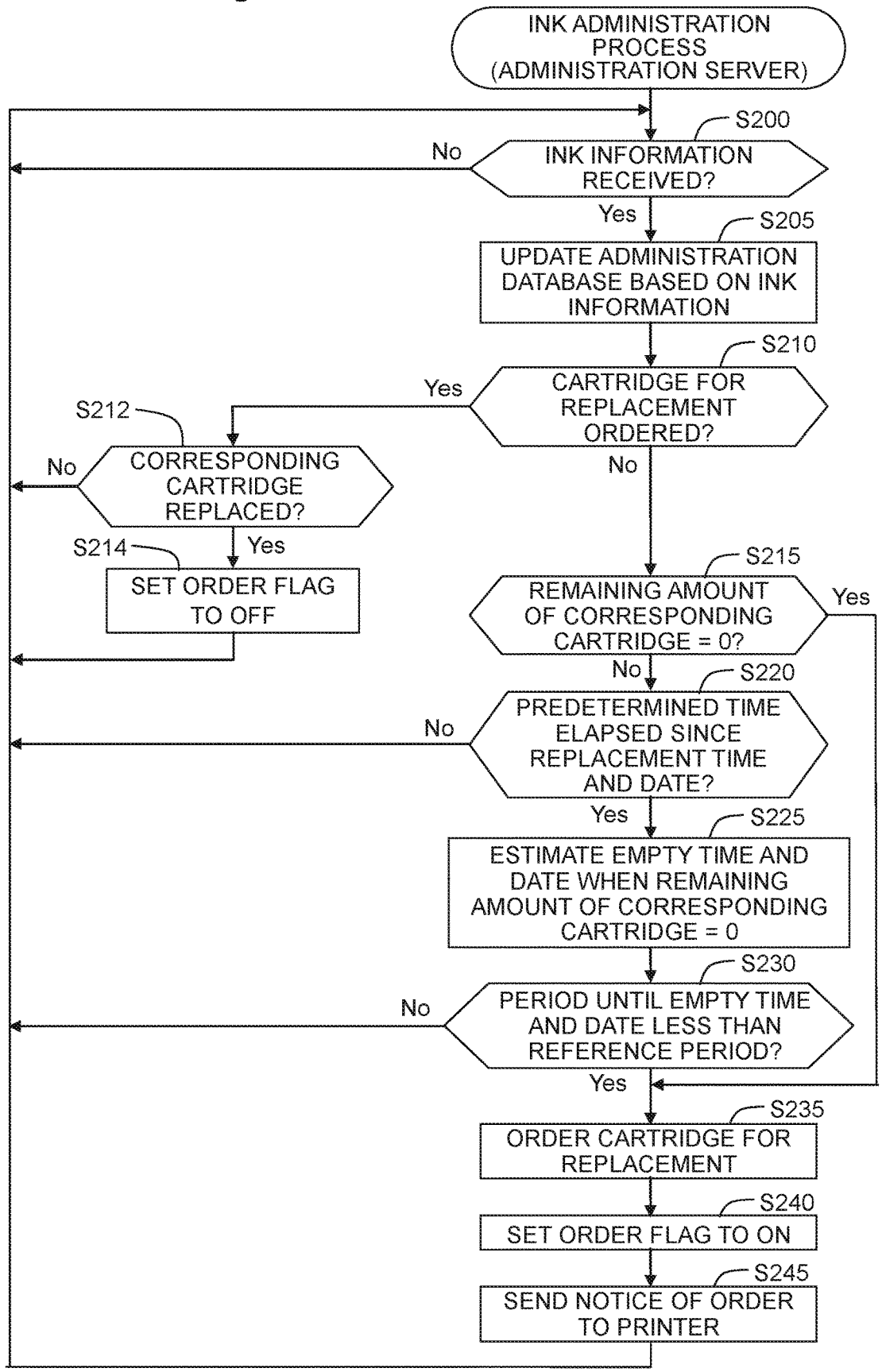
FIG. 6 is a flow chart of an ink administration process.

In the ink administration process shown in FIG. 6, in the step S200, the CPU 310 of the administration server 300 determines whether or not the ink information is received from any of the printers of the administering targets. If the ink information is not received (S200: No), then the CPU 310 stands by until the ink information is received.

If the ink information is received (S200: Yes), then in the step S205, the CPU 310 updates the administration database PD based on the received ink information. In particular, the CPU 310 determines the entry to record the ink information from a number of entries included in the administration database PD, based on the model name and the serial number of the transmitter printer included in the ink information. Further, the CPU 310 determines the type (one of CMYK) of an ink cartridge corresponding to the ink information (also to be referred to as corresponding cartridge), from the serial number of the ink cartridge included in the ink information. The CPU 310 records the ink remaining ratio IR and the number of replacements included in the ink information associated with the time and date of receiving the ink information, into the field of the cartridge type determined in the determined entry. Further, if the ink remaining ratio IR included in the ink information acquired in the step S200 is not less than the boundary remaining ratio BR, then the CPU 110 sets "usual" to the remaining state of the cartridge type determined in the determined entry, but sets "little" to the remaining state if the ink remaining ratio IR is less than the boundary remaining ratio BR. The boundary remaining ratio BR is the ink remaining ratio IR corresponding to the boundary ink amount BY. For example, the boundary remaining ratio BR is the ratio (in percentages for example) of the boundary ink amount BV against the sum of the initial ink amount IV and the boundary ink amount BV (BR=100×BV/(IV+BV)).

In the step S210, the CPU 310 determines whether or not the cartridge for replacement is ordered for the corresponding cartridge. If the order flag is "ON" which corresponds to the corresponding cartridge recorded in the administration database PD, then the CPU 310 determines that the cartridge for replacement is ordered.

If the cartridge for replacement is ordered (S210: Yes), then in the step S212, the CPU 310 determines whether or not the corresponding cartridge is replaced. In particular, if the number of replacements included in the ink information received this time is larger than the number of replacements included in the ink information received last time, then the CPU 310 determines that the corresponding cartridge is replaced.

If the corresponding cartridge is replaced (S212: Yes), then in the step S214, the CPU 310 sets the order flag to "OFF" corresponding to the corresponding cartridge recorded in the administration database PD, and returns the process to the step S200. If the corresponding cartridge is not replaced (S212: No), then the CPU 310 keeps the order flag at "ON" as it is, and returns the process to the step S200.

If the cartridge for replacement is not ordered (S210: No), then in the step S215, the CPU 310 determines whether or not the remaining amount of the corresponding cartridge is zero. In particular, if the ink remaining ratio IR included in the received ink information is less than the boundary remaining ratio BR, then because the corresponding cartridge is in the aforementioned second state ST2 (FIG. 2B), the CPU 310 determines that the remaining amount of the corresponding cartridge is zero.

If the remaining amount of the corresponding cartridge is zero (S215: Yes), then because it is possible to replace the corresponding cartridge without wasting the ink Ik, the CPU 310 orders the cartridge for replacement in the step S235. In particular, the administration server 300 sends, to the supplier server 400, ink order information for ordering the cartridge for replacement (for example, information showing a code indicating the type of the ink cartridge 200A to be ordered, and the place of receiving the ordered ink cartridge 200A (such as the address and name)). As a result, for example, the business entity operating the supplier server 400 delivers the cartridge for replacement to the user of the printer of an administering target (such as the printer 100A).

If the remaining amount of the corresponding cartridge is not zero (S215: No), then in the step S220, the CPU 310 determines whether or not a predetermined time has elapsed since a replacement time and date Tr of the previous corresponding cartridge. For example, the CPU 310 refers to the administration database PD and determines the replacement time and date Tr to be the time and date of receiving the ink information received first after the previous corresponding cartridge is replaced, so as to determine whether or not the predetermined time has elapsed since time and date of replacement Tr.

Figure 7:
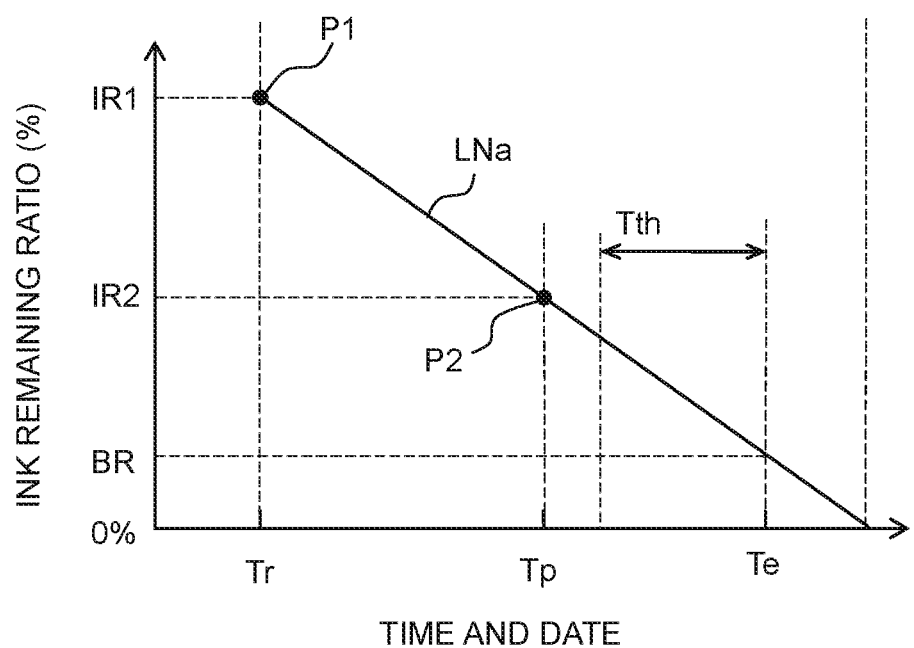
FIG. 7 is a graph showing a relationship between an ink remaining ratio (vertical axis) and time and date (horizontal axis).

If the predetermined time has elapsed since the replacement time and date Tr of the previous corresponding cartridge (S220: Yes), then in the step S225, the CPU 310 estimates a time and date Te (to be referred to as empty time and date) on the basis of the graph of FIG. 7 when the remaining amount of the corresponding cartridge becomes zero. In the graph of FIG. 7, the vertical axis represents the ink remaining ratio IR while the horizontal axis represents the time and date The point P1 on the graph shows the ink remaining ratio IR1 at the replacement time and date Tr of the corresponding cartridge while the point P2 shows the ink remaining ratio IR2 at the current time and date Tp. The ink remaining ratio IR1 is determined by referring to the administration database PD. The ink remaining ratio IR2 is an ink remaining ratio included in the ink information received this time in the step S200. The CPU 310 determines a line LNa linking the point Pb and the point P2, and determines the estimated empty time and date Te to be the time and date when the ink remaining ratio IR becomes the boundary remaining ratio BR based on the line LNa.

In the step S230, the CPU 310 determines whether or not the period from the current time and date Tp to the empty time and date Te is less than a reference period Tth. The reference period Tth is set to be almost the same as a delivery period needed from the order of the cartridge for replacement to the delivery of the cartridge for replacement to the user. By virtue of this, when the remaining amount of the corresponding cartridge becomes zero, the cartridge for replacement is suitably delivered to the user. In the example of FIG. 7, the CPU 310 determines that the period from the current time and date Tp to the empty time and date Te is not less than the reference period Tth.

If the period from the current time Tp and date to the empty time and date Te is less than the reference period Tth (S230: Yes), then in the step S235, the CPU 310 places an order of the cartridge for replacement.

If the predetermined time has not elapsed since the replacement time and date Tr of the previous corresponding cartridge (S220: No), then it is conceivable to have a certain length of time till the cartridge for replacement is ordered; therefore, at the present time, there is no need to carry out the aforementioned steps S225 and S230. Hence, on this occasion, the CPU 310 returns the process to the step S200 without carrying out the steps S225 and S230.

If the period from the current time and date Tp to the empty time and date Te is not less than the reference period Tth (S230: No), then if the cartridge for replacement is ordered at the present time, then it is conceivable to deliver the cartridge for replacement to the user at too early a time. If the cartridge for replacement is delivered to the user too early, then such a disadvantage may arise more likely that the cartridge is replaced before the remaining amount of the corresponding cartridge becomes zero. Further, it is possible to lay a burden on the user for storing the cartridge for replacement. Therefore, on this occasion, the CPU 310 returns the process to the step S200 without ordering the cartridge for replacement.

In the step S240 after the cartridge for replacement is ordered (S235), the CPU 310 sets the order flag to "ON" corresponding to the corresponding cartridge. In the step S245, the CPU 310 sends the notice of order to the printer sending the ink information which is received in the step S200 (the printer 100A for example) to indicate that the cartridge for replacement is ordered, and then returns the process to the step S200.

The following explanation will be made on an operation of the system 1000 realized by carrying out the ink related process (FIG. 5) and the ink administration process (FIG. 6) explained above, referring to FIGS. 8A and 8B.

At the start point of the sequence diagram of FIGS. 8A and 8B, a first ink cartridge is defined to refer to the ink cartridge 200A installed in the printer 100A. A second ink cartridge is defined to refer to the ink cartridge 200A installed next in the printer 100A to the first ink cartridge, i.e., the ink cartridge 200A to replace the first ink cartridge. At the start point of the sequence diagram of FIGS. 8A and 8B, the cartridge for replacement (the second ink cartridge) is regarded as not yet ordered.

The set interval is set to "short" for the replacement time and date Tr1 when the first ink cartridge replaces the ink cartridge 200A installed in the printer 100A (the steps S100 and S105 of FIG. 5). Therefore, as shown in the steps S1 and S7, the ink information is sent periodically at the "short" set interval to the administration server 300 from the printer 100A (the steps S130 to S140 of FIG. 5). As shown in the steps S2, S3, S8 and S9, each time the ink information is sent to the administration server 300, the administration server 300 updates the administration database PD (the step S205 of FIG. 6), and determines whether or not the cartridge for replacement needs to be ordered (the steps S215 to S230 of FIG. 6).

If the CPU 310 determines that the ink Ik is consumed in the printer 100A, for example, and thus the cartridge for replacement is ordered in the step S9 (S230: Yes in FIG. 6), then in the step S10, the CPU 310 carries out the order of the cartridge for replacement, that is, sends the ink order information from the administration server 300 to the supplier server 400 (the step S235 of FIG. 6). In the step S11 after the ink order information is sent, the notice of order is sent from the administration server 300 to the printer 100A (the step S245 of FIG. 6). If the printer 100A receives the notice of order, then the printer 100A determines that the cartridge for replacement is ordered (S100: Yes in FIG. 5), and sets the set interval to "long" in the step S12 (the step S115 of FIG. 5). Therefore, for example, as shown in the step S13, the ink information is then sent periodically at the "long" set interval from the printer 100A to the administration server 300 (the steps S130 to S140 of FIG. 5). If the ink information is received after ordering the cartridge for replacement, then the administration server 300 updates the administration database PD (the step S205 of FIG. 6) as shown in the step S14, but does not determine whether or not the cartridge for replacement needs to be ordered (the steps S215 to S230 of FIG. 6; S210: Yes of FIG. 6).

The supplier server 400 having received the ink order information carries out a delivery process for the cartridge for replacement in the step S15. For example, the supplier server 400 notifies a staff in charge of delivery of a delivery instruction for the cartridge for replacement, and accepts input of information indicating that the delivery is finished. The staff in charge of delivery delivers the cartridge for replacement to the user of the printer 100A, and inputs the information indicating that the delivery is finished to the supplier server 400. If that information indicating that the delivery is finished is inputted to the supplier server 400, then in the step S16, the notice of delivery is sent to the administration server 300 from the supplier server 400. If the administration server 300 receives the notice of delivery, then in the step S17, the notice of delivery is sent from the administration server 300 to the printer 100A.

If the printer 100A receives the notice of delivery, then the printer 100A determines that the cartridge for replacement is delivered (S120: Yes in FIG. 5), and sets the set interval to "medium" in the step S18 (the step S125 of FIG. 5). Therefore, as shown in the step S19, for example, the ink information is then sent periodically at the "medium" set interval from the printer 100A to the administration server 300 (the steps S130 to S140 of FIG. 5). If the ink information is received after delivering the cartridge for replacement, then the administration server 300 updates the administration database PD (the step S205 of FIG. 6) as shown in the step S20, but does not determine whether or not the cartridge for replacement needs to be ordered (the steps S215 to S230 of FIG. 6; S210: Yes of FIG. 6).

Then, if in the printer 100A, the first ink cartridge is replaced by the second ink cartridge as the delivered cartridge for replacement, then in the step S22, the printer 100A detects that the ink cartridge is replaced (S100: Yes in FIG. 5). If the printer 100A detects that the ink cartridge is replaced, then it sets the set interval to "short" in the step S23 (the step S105 of FIG. 5). Therefore, in the same manner as in the steps S1 and S7 described earlier on, the ink information is then sent periodically at the "short" set interval from the printer 100A to the administration server 300 (illustration omitted in FIG. 8).

Note that at any time, following the instruction of the user of the printers 100A to 100C, a request for screen data may be sent to the administration server 300 from the terminal device 500. The administration server 300 sends the screen data shown on the administration list ML (FIG. 4) to the terminal device 500, according to the request for the screen data. The administration list ML reflects the contents of the administration database PD at the point of receiving the request for screen data. By virtue of this, the user can take a look at the administration list ML at any time.

In a graph shown in FIG. 9 to explain a set interval of the first embodiment, the vertical axis represents the ink remaining ratio IR while the horizontal axis represents the time and date. In FIG. 9, the line LN1 shows the remaining amount of the first ink cartridge. The line LN2 shows the remaining amount of the second ink cartridge to be used next to the first ink cartridge, that is, the cartridge for replacement for the first ink cartridge. FIG. 9 shows the times and dates Tr1 and Tr2 (replacement times and dates) when the first ink cartridge and the second ink cartridge are installed, and the empty times and dates Te1 and Te2 when the remaining quantities of the first ink cartridge and the second ink cartridge become zero. As is understood from the explanation so far, during the period from the replacement time and date Tr1 of the first ink cartridge to the order time and date To1 when the second ink cartridge is ordered, the set interval is set at "short". During the period from the order time and date To1 to the delivery time and date Tt1 when the second ink cartridge is delivered, the set interval is set at "long". During the period from the delivery time and date Tt1 to the replacement time and date Tr2 of the second ink cartridge, the set interval is set at "medium". Then, during the period from the replacement time and date Tr2 to the order time and date To2 of the cartridge for replacement to be used next to the second ink cartridge, the set interval is set at "short". During the period from the order time and date To2 to the delivery time and date Tt2 of the cartridge for replacement, the set interval is set at "long".

According to the first embodiment explained above, the printer 100A (the CPU 110) determine the ink remaining ratio IR being the value related to the remaining amount of the ink Ik in the print unit 170A (the step S135 of FIG. 5), and outputs the ink information based on the determined ink remaining ratio IR (sends the same to the administration server 300 (the step S140 of FIG. 5)). The printer 100A determines whether or not the cartridge for replacement is ordered (the step S110 of FIG. 5). The administration server 300 determines the time to order the cartridge for replacement by using the ink information sent from the printer 100A (the steps S225 to S235 of FIG. 6). The printer 100A sends the ink information to the administration server 300 at a shorter interval before the cartridge for replacement is ordered than after the cartridge for replacement is ordered (the steps S100 to S127 of FIG. 5). As a result, both before and after the cartridge for replacement is ordered, it is possible to properly send (output) the ink information to the administration server 300. For example, the ink information is sent to the administration server 300 at a shorter interval before the cartridge for replacement is ordered (such as in the period from the replacement time and date Tr1 to the order time and date To1 of FIG. 9) than after the cartridge for replacement is ordered (such as in the period from the order time and date To1 to the time and date Tt1 of FIG. 9). Therefore, before the cartridge for replacement is ordered, in the administration server 300, it is possible to precisely monitor the remaining amount of the ink cartridge 200A. As a result, it is possible to precisely determine the time of ordering the cartridge for replacement (such as the order time and date To1). After the cartridge for replacement is ordered, because the ink information is sent to the administration server 300 at a comparatively longer interval, needless ink information is restrained from transmission.

The explanation will be made in more detail. If the time of ordering the cartridge for replacement is not determined precisely, then for example, it is possible to give rise to the inconvenience that the cartridge for replacement is delivered too early before the empty time and date Te of the ink cartridge in use, and/or the inconvenience that the cartridge for replacement is delivered too late after the empty time and date Te. If the cartridge for replacement is delivered too early before the empty time and date Te, then although the ink Ik still remains in the ink cartridge 200A in use, the ink cartridge 200A may be replaced such that the ink Ik may be wasted. If the cartridge for replacement is delivered too late after the empty time and date Te, for example, the cartridge for replacement may be delivered after the intermediate container 175A is empty of the ink Ik such that the printer 100A is no longer able to print, and then an unprintable period may arise. Therefore, it is highly necessary to precisely determine the time of ordering the cartridge for replacement. Hence, before the cartridge for replacement is ordered, the administration server 300 needs to monitor the remaining amount of the ink cartridge 200A at a comparatively high precision. Therefore, before the cartridge for replacement is ordered, it is preferable to send the ink information to the administration server 300 at a comparatively high frequency, that is, at a comparatively short interval. On the other hand, after the cartridge for replacement is ordered, it is not necessary to monitor the remaining amount of the ink cartridge 200A at so high a precision. Especially, during the period from the order of cartridge for replacement to the delivery of the cartridge for replacement, even if the remaining amount of the ink cartridge 200A in use becomes zero, because the cartridge for replacement has not yet been delivered to the user, the user cannot replace the ink cartridge 200A. Therefore, during the period from the order of the cartridge for replacement to the delivery of the cartridge for replacement, there is a low significance in precisely informing the user of the remaining amount of the ink cartridge 200A, such that the administration server 300 does not need to monitor the remaining amount of the ink cartridge 200A at a high precision. In view of such a situation, in the first embodiment, the printer 100A sends the ink information to the administration server 300 at a shorter interval before the cartridge for replacement is ordered than after the cartridge for replacement is ordered. As a result, it is possible to precisely determine the time of ordering the cartridge for replacement before the cartridge for replacement is ordered and, after the cartridge for replacement is ordered, needless ink information is restrained from transmission. It is not preferable to send needless ink information because, for example, it may give rise to an increase in the processing load on the printer 100A and the administration server 300, and an increase in the load on the network such as the local area network NT and the Internet IT.

Further, according to the first embodiment, when the time has come to send the ink information to the administration server 300 (the step S130: Yes in FIG. 5), the printer 100A determines the ink remaining ratio IR (the step S135 of FIG. 5). The printer 100A outputs the ink information (the step S140 of FIG. 5) by using the ink remaining ratio IR determined when the time has come to send the ink information to the administration server 300. As a result, it is possible to properly determine the ink remaining ratio IR both before and after the cartridge for replacement is ordered. For example, it is possible to determine the time of ordering the cartridge for replacement at a good precision before the cartridge for replacement is ordered, and to restrain the specification of needless ink remaining ratio IR after the cartridge for replacement is ordered.

Further, according to the first embodiment, after the cartridge for replacement is ordered, the printer 100A detects replacement of the ink cartridge 200A (the step S100 of FIG. 5). After the ink cartridge 200A is replaced, the printer 100A sends the ink information to the administration server 300 at the same interval as before the cartridge for replacement is ordered. For example, in FIG. 9, during the period from the replacement time and date Tr2 when the first ink cartridge is replaced by the second ink cartridge, to the order time and date To2 for the cartridge for replacement to be used next to the second ink cartridge, the set interval is set at "short". That is, the set interval for this period is the same as the set interval till the order time and date To1 of ordering the second ink cartridge. As a result, for example, the order time and date To2 is determined precisely for the cartridge for replacement to be used next to the second ink cartridge.

Further, according to the first embodiment, after the cartridge for replacement is ordered, the printer 100A receives from the administration server 300 the notice of delivery indicating the cartridge for replacement is delivered (the step S17 of FIG. 8). It is possible to refer to the notice of delivery as situational information about how the ordered cartridge for replacement is prepared for. Using the notice of delivery, the printer 100A determines whether or not the cartridge for replacement is delivered (the step S120 of FIG. 5). After the cartridge for replacement is delivered, the printer 100A sends the ink information to the administration server 300 (the step S125 of FIG. 5) at a shorter interval (in particular, at the "medium" set interval) than before the cartridge for replacement is delivered but after the cartridge for replacement is ordered. In particular, during the period after the cartridge for replacement is ordered but before the cartridge for replacement is delivered (for example, the period from the order time and date To1 to the delivery time and date Tt1 in FIG. 9), the set interval is "long". Then, during a period after the cartridge for replacement is delivered (such as the period from the delivery time and date Tt1 to the replacement time and date Tr2 of FIG. 9), the set interval is "medium" which is shorter than "long". After the cartridge for replacement is ordered, until the cartridge for replacement is delivered, because the user cannot replace the ink cartridge 200A, the administration server 300 stays at a low necessity of informing the user of the ink remaining state of the ink cartridge of the replacing target. After the cartridge for replacement is delivered, because the user can replace the ink cartridge 200A, it is preferable for the administration server 300 to inform the user, via the administration list ML, whether or not the ink cartridge of the replacing target is in the second state ST2 (FIG. 2B) where it is possible to replace the ink cartridge of the replacing target. Hence, after the cartridge for replacement is delivered, there is a higher necessity to send the ink information to the administration server 300 than during the period after the cartridge for replacement is ordered but before the cartridge for replacement is delivered. In view of such a situation, in the first embodiment as described above, during a period after the cartridge for replacement is delivered, the set interval is set at "medium" which is shorter than "long"; therefore it is possible to send the ink information to the administration server 300 at a proper frequency as necessary both before and after the cartridge for replacement is delivered.

Note that because the printer 100A adopts the dual-chamber supply method, even if the ink cartridge of a replacing target is in the second state ST2 being replaceable (FIG. 2B), it is still possible to continue printing by using the ink Ik remaining in the intermediate container 175A. Then, if the ink cartridge of a replacing target is in the second state ST2 being replaceable, then the user can replace the ink cartridge at any time. Therefore, high precision is not so much required for determining whether or not the ink Ik remaining in the printer 100A has transited to the second state ST2 as for the ink cartridge of the replacing target, compared to determining the order time and date for the cartridge for replacement. In view of such a situation, in the first embodiment, during a period after the cartridge for replacement is delivered, the set interval is set at "medium" which is longer than "short" before the cartridge for replacement is ordered. As a result, it is possible to send the ink information to the administration server 300 at a proper frequency both before and after the cartridge for replacement is ordered and after the cartridge for replacement is delivered.

Further, in the first embodiment, each time the ink information is sent, the ink remaining ratio IR included in the ink information is determined (the steps S135 and S140 of FIG. 5). That is, the printer 100A determines the ink remaining ratio IR at a shorter interval before the cartridge for replacement is ordered than after the cartridge for replacement is ordered (the steps S100 to S127 of FIG. 5). As a result, it is possible to properly determine the ink remaining ratio IR both before and after the cartridge for replacement is ordered. For example, the ink remaining ratio IR is determined at a shorter interval before the cartridge for replacement is ordered than after the cartridge for replacement is ordered. Therefore, the time of ordering the cartridge for replacement is determined at a good precision (such as the order time and date To1) as well as needless specification of the ink remaining ratio IR is restrained after the cartridge for replacement is ordered.

Further, according to the first embodiment, the printer 100A determines the ink remaining ratio IR at the same interval after the ink cartridge 200A is replaced as before the cartridge for replacement is ordered. As a result, after the ink cartridge 200A is replaced, the time and date of ordering the cartridge for replacement to be used yet next is determined at a good precision (such as the order time and date To2 of FIG. 9).

Further, according to the first embodiment, after the cartridge for replacement is delivered, the printer 100A determines the ink remaining ratio IR (the step S125 of FIG. 5) at a shorter interval (in particular, at the set interval of "medium") than after the cartridge for replacement is ordered but before the cartridge for replacement is delivered. For example, during a period after the cartridge for replacement is delivered, the set interval is set at "medium" which is shorter than "long"; therefore, it is possible to determine the ink remaining ratio IR at a proper frequency as necessary both before and after the cartridge for replacement is delivered.

Further, in the first embodiment, as described above, in the period after the cartridge for replacement is delivered, the set interval is set at "medium" which is longer than "short" before the cartridge for replacement is ordered. As a result, it is possible to determine the ink remaining ratio IR at a proper frequency both before the cartridge for replacement is ordered and after the cartridge for replacement is delivered.

Further, in the first embodiment, the printer 100A sends (outputs) the ink information to the administration server 300 which is an external device connected via the network (the local area network NT and the Internet IT). As a result, in the administration server 300, it is possible to precisely determine the time of ordering the cartridge for replacement (such as the order times and dates To1 and To2) and at the meantime to restrain overloading the network due to excessive transmission of the ink information.

Further, in the first embodiment, the printer 100A including the print unit 170A sends the ink information to the administration server 300. As a result, for example, without needing another administration device, the administration device connected to the local area network NT can be more easily and simply configured as a system than the case where the ink information is collected from the printer 100A and then sent to the administration server 300.

As is understood from the above explanation, the ink information in the first embodiment is an example of the printing material information. Further, each of the printers 100A to 100C in the first embodiment is an example of the processing apparatus. The administration server 300 of the first embodiment is an example of the first server, and the supplier server 400 is an example of the second server.

Second Embodiment

An ink related process carried out by the printers 100A to 100C according to a second embodiment is different from the ink related process according to the first embodiment (FIG. 5). In the ink related process shown in FIG. 10 according to the second embodiment, the steps S100 to S117 and the steps S130 to S140 are the same as the steps with the same reference signs of FIG. 5. The ink related process of the second embodiment does not carry out the steps S120 to S127 of FIG. 5. The ink related process of the second embodiment carries out the steps S150B and S160B after the step S140.

In the step S150B, the CPU 310 determines whether or not the remaining amount of the target cartridge becomes zero. In particular, if the ink remaining ratio IR determined in the immediately preceding step S135 is less than the boundary remaining ratio BR, then the CPU 310 determines that the remaining amount of the target cartridge has become zero. In other words, to determine whether or not the remaining amount of the target cartridge is zero is to determine whether or not the remaining state of the target cartridge in the printer 100A has transited from the first state ST1 (FIG. 2A) to the second state ST2 (FIG. 2B).

If the remaining amount of the target cartridge has become zero (S150B: Yes), then in the step S160B, the CPU 110 stops determining the ink remaining ratio IR and sending the ink information. To stop determining the ink remaining ratio IR and sending the ink information is equivalent to let the set interval be "infinitely long". By virtue of this, until detecting that the next target cartridge is replaced (S100: Yes) and letting the set interval be "short" (the step S105), the CPU 110 neither determines the ink remaining ratio IR (the step S135) nor sends the ink information (the step S140).

If the remaining amount of the target cartridge is not zero (S150B: No), then the CPU 310 skips the step S160B and returns the process to the step S100.

Figure 11:
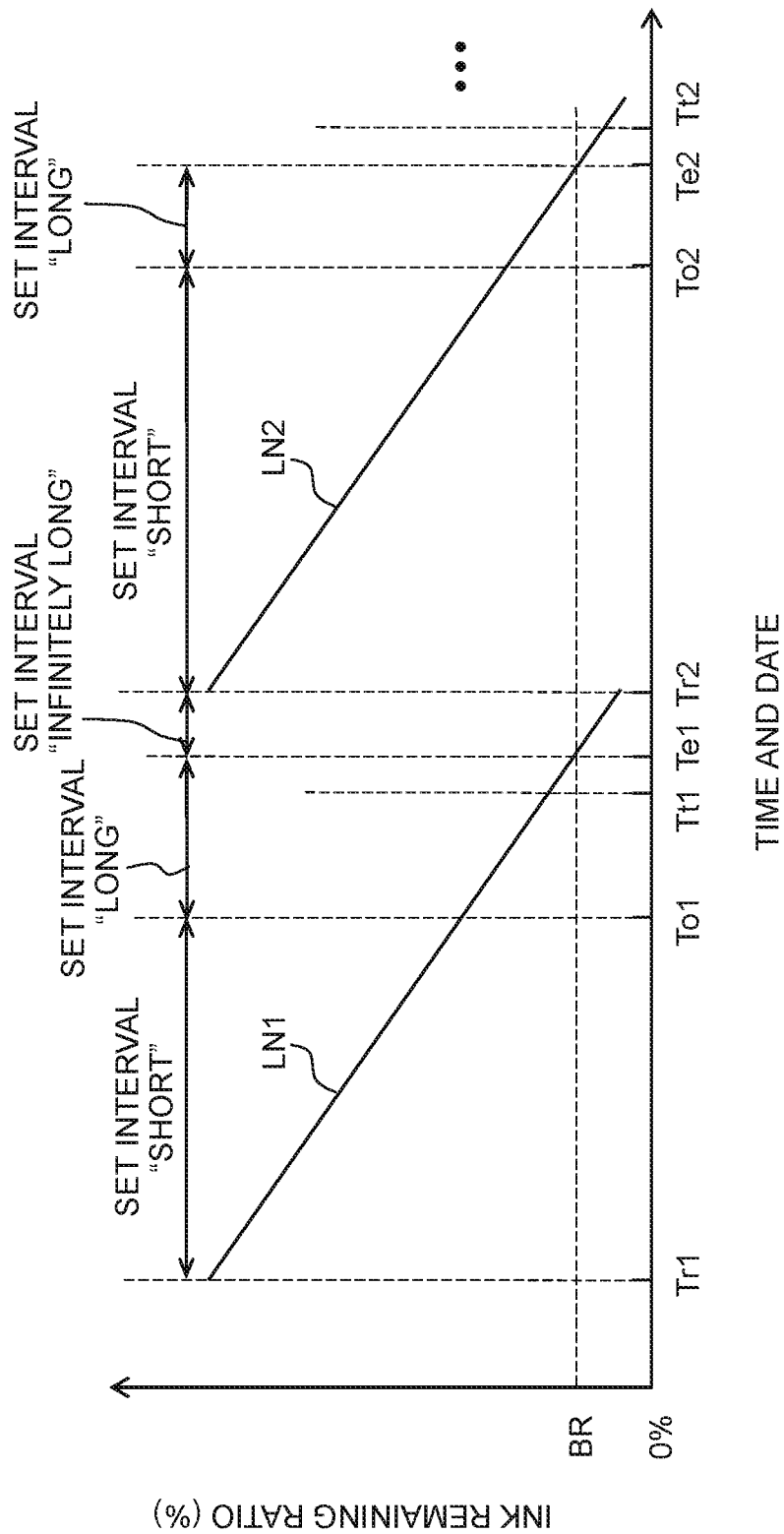
FIG. 11 is a graph for explaining a set interval in the second embodiment.

In a graph shown in FIG. 11 to explain a set interval of the second embodiment, in the same manner as in FIG. 9, the vertical axis represents the ink remaining ratio IR while the horizontal axis represents the time and date. In FIG. 11, like FIG. 9, the line LN1 shows the remaining amount of the first ink cartridge, while the line LN2 shows the remaining amount of the second ink cartridge to be used next to the first ink cartridge.

As shown in FIG. 11, in the second embodiment, during the period from the replacement time and date Tr1 of installing the first ink cartridge to the order time and date To1 when the second ink cartridge is ordered, in the same manner as in the first embodiment, the set interval is set at "short". During the period from the order time and date To1 to the empty time and date Te1 when the ink remaining amount of the first ink cartridge becomes zero, the set interval is set at "long". During the period from the empty time and date Te1 to the replacement time and date Tr2 of installing the second ink cartridge, the set interval is set at "infinitely long" such that as described above, neither specification of the ink remaining ratio IR nor transmission of the ink information are carried out. Then, during the period from the replacement time and date Tr2 to the order time and date To2 of the cartridge for replacement to be used next to the second ink cartridge, the set interval is set at "short". During the period from the order time and date To2 to the empty time and date Te2 when the ink remaining amount of the second ink cartridge becomes zero, the set interval is set at "long".

According to the second embodiment explained above, the printer 100A sends the ink information to the administration server 300 at the "short" set interval before the cartridge for replacement is ordered (for example, from the replacement time and date Tr1 to the order time and date To1 in FIG. 11). The printer 100A sends the ink information to the administration server 300 at the "long" set interval which is longer than the "short" set interval after the cartridge for replacement is ordered but before the remaining state of the ink Ik of the printer 100A transits from the first state ST1 to the second state ST2 (for example, from the order time and date To1 to the empty time and date Te1 of FIG. 11). Further, after the remaining state of the ink Ik of the printer 100A transits from the first state ST1 to the second state ST2, the printer 100A does not output the ink information (for example, from the empty time and date Te1 to the replacement time and date Tr2 of FIG. 11).

For example, in the printer 100A of the dual-chamber supply method, it is preferable to replace the ink cartridge 200A after the transition from the first state ST1 to the second state ST2. Therefore, it is preferable for the administration server 300 to administer the remaining amount of the ink Ik and inform the user of the transition from the first state ST1 to the second state ST2 until the transition from the first state ST1 to the second state ST2. After the transition from the first state ST1 to the second state ST2, it becomes not so necessary for the administration server 300 to administer the remaining amount of the ink Ik until the ink cartridge 200A is replaced. Further, as described above, the determination of whether or not the remaining state of the ink Ik of the printer 100A as for the ink cartridge of the replacing target has transited from the first state ST1 to the second state ST2 is not required for a high precision compared to the determination of the time and date of ordering the cartridge for replacement. In view of this, in the second embodiment, the set interval is set as described above. As a result, before and after the cartridge for replacement is ordered, and before and after the transition to the second state ST2, it is possible to send the ink information to the administration server 300 at a proper frequency for both cases. Therefore, for example, it is possible to precisely determine the time and date of ordering the cartridge for replacement, properly determine whether or not the remaining state of the ink Ik has transited to the second state ST2 and, furthermore, restraining transmission of needless ink information.

Further, in the second embodiment, in the same manner as in the first embodiment, each time the ink information is sent (the steps S135 and S140 of FIG. 11), the printer 100A determines the ink remaining ratio IR included in the ink information. Therefore, according to the second embodiment, the printer 100A determines the ink remaining ratio IR at the "short" set interval before the cartridge for replacement is ordered (such as from the replacement time and date Tr1 to the order time and date To1 of FIG. 11). The printer 100A determines the ink remaining ratio IR at the "long" set interval which is longer than the "short" set interval after the cartridge for replacement is ordered but before the remaining state of the ink Ik of the printer 100A transits from the first state ST1 to the second state ST2 (such as from the order time and date To1 to the empty time and date Te1 of FIG. 11). Further, the printer 100A does not determine the ink remaining ratio IR after the remaining state of the ink Ik of the printer 100A has transited from the first state ST1 to the second state ST2 (such has from the empty time and date Te1 to the replacement time and date Tr2 of FIG. 11). As a result, it is possible to determine the ink remaining ratio IR at a proper frequency both before and after the cartridge for replacement is ordered and before and after the transition to the second state ST2. Therefore, for example, it is possible to precisely determine the time and date of ordering the cartridge for replacement, properly determine whether or not the remaining state of the ink Ik has transited to the second state ST2 and, furthermore, restraining transmission of needless ink information.

As is understood from the above explanation, the "short" set interval in the second embodiment is an example of the first interval, and the "long" set interval is an example of the second interval. Further, each of the printers 100A to 100C in the second embodiment is an example of the processing apparatus. The administration server 300 of the second embodiment is an example of the first server, and the supplier server 400 is an example of the second server.

Third Embodiment

Figure 10:
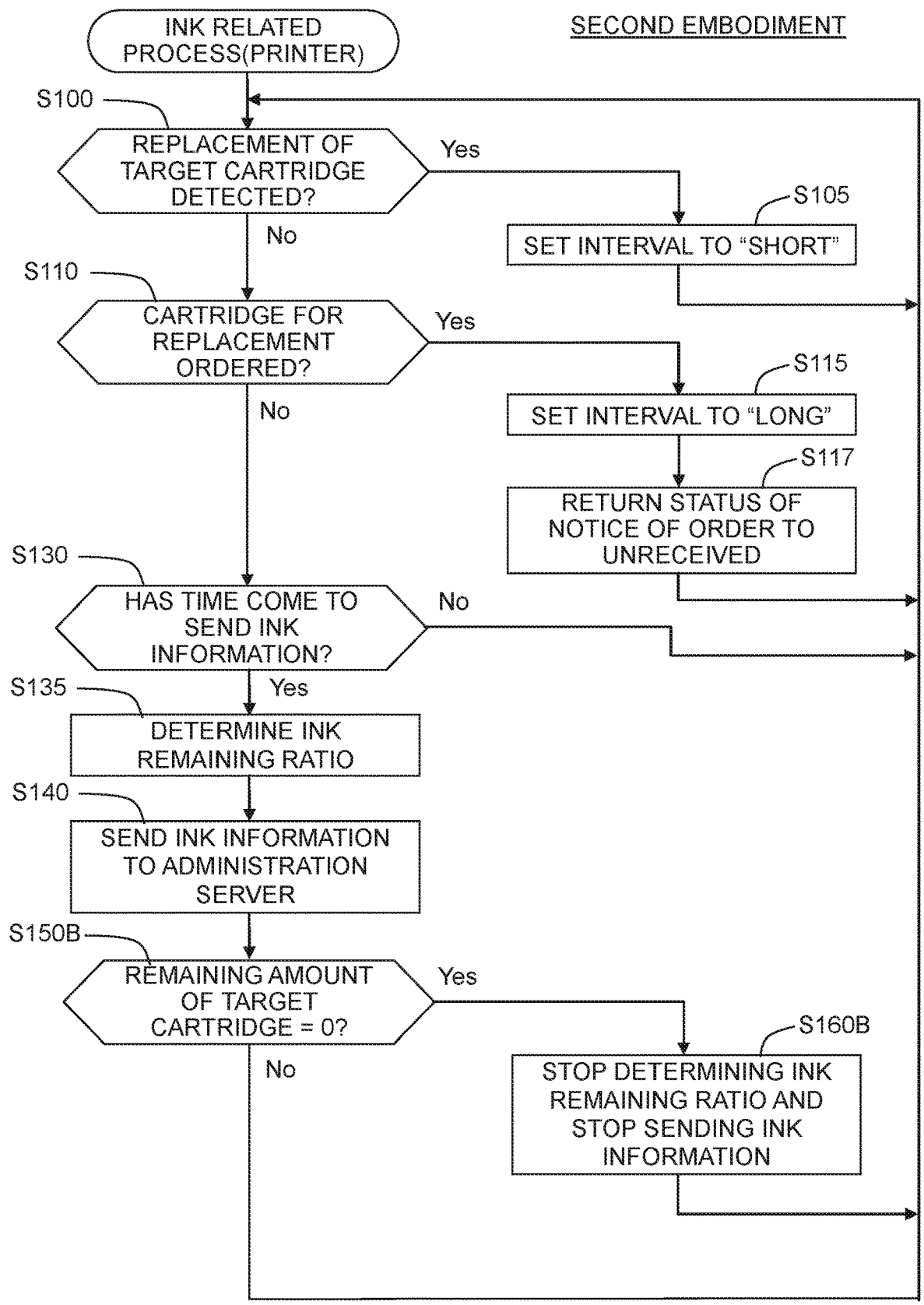
FIG. 10 is a flow chart of an ink related process according to a second embodiment of the present invention.

In the above respective embodiments, the printers 100A to 100C carry out the ink related process of FIGS. 5 and 10. Instead of that, in a third embodiment, the printers 100A to 100C do not carry out the ink related process of FIGS. 5 and 10. Then, in the third embodiment, the administration server 300 constantly carries out an ink related process which is different from that of FIGS. 5 and 10. The ink related process shown in FIG. 12 according to the third embodiment is carried out independently with each of the CMYK cartridges as the target of the printers 100A to 100C of the administering targets.

Figure 12:
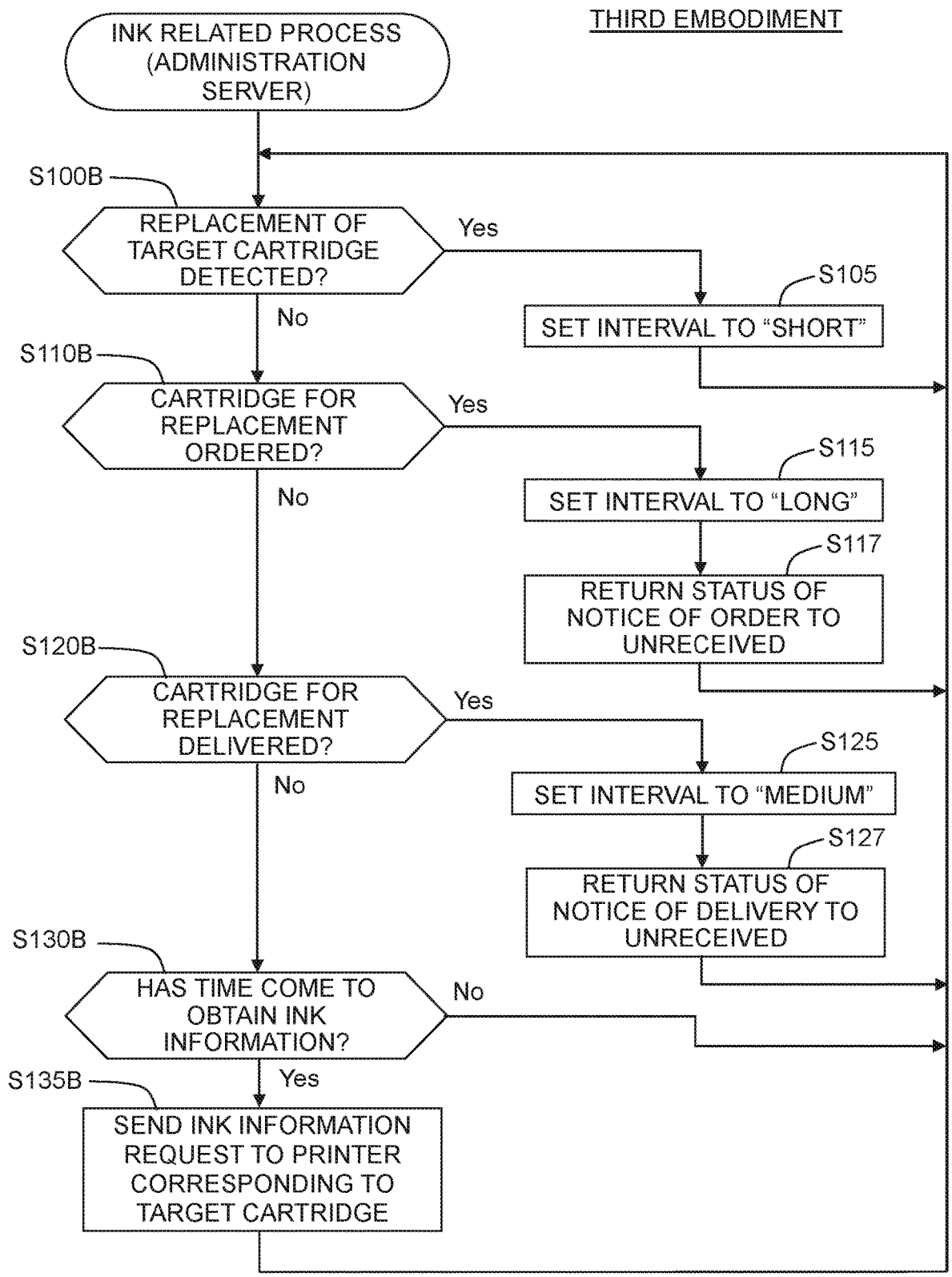
FIG. 12 a flow chart of an ink related process according to a third embodiment of the present invention.

In the ink related process of FIG. 12, instead of the steps S100, S110, and S120 of FIG. 5, the steps S100B, S110B, and 5120B are carried out, respectively. In the ink related process of FIG. 12, instead of the steps S130 to S140 of FIG. 5, the steps S130B and S135B are carried out. The other steps of FIG. 12 are the same as those with the same reference signs of FIG. 5.

In the step S100B, the CPU 310 of the administration server 300 determines whether or not replacing the target cartridge is detected. In particular, the administration server 300 detects that the target cartridge is replaced if the number of replacements of the target cartridge included in the ink information received from each printer increases to be larger than the number of replacements of the target cartridge included in the previous ink information.

In the step S110B, the CPU 310 determines whether or not the cartridge for replacement to be used next to the target cartridge is ordered. In particular, if the order flag is "ON" for the target cartridge recorded in the administration database PD, then the CPU 310 determines that the cartridge for replacement is ordered.

In the step S120B, the CPU 310 determines whether or not the cartridge for replacement is delivered. In particular, if the administration server 300 receives a notice of delivery for the cartridge for replacement of the target cartridge from the supplier server 400, it determines that the cartridge for replacement is delivered.

In the step S130B, the CPU 310 determines whether or not the time has come to acquire the ink information (the acquisition time) from the printer (the printer 100A, for example) corresponding to the target cartridge. In particular, the CPU 310 determines the acquisition time has come if the current set interval has elapsed since the acquisition time of the previous ink information.

If the acquisition time has come for the ink information (S130B: Yes), then in the step S135, the CPU 310 sends an ink information request to the printer corresponding to the target cartridge. If the acquisition time has not come for the ink information (S130B: No), then the CPU 310 skips the step S135, and returns the process to the step S110B.

On receiving the ink information from the administration server 300, each printer of the administering target sends the ink information including the ink remaining ratio IR to the administration server 300 as the replay to the ink information request. Independent from the ink related process, the administration server 300 constantly carries out the ink administration process (FIG. 6) in the same manner as in the first and second embodiments. Therefore, using the ink information sent from the printer of an administering target, the administration server 300 updates the administration database PD and orders the cartridge for replacement in the same manner as in the first and second embodiments.

As described above, in the third embodiment, the administration server 300 sets the set interval and the printer of an administering target sends the ink information to the administration server 300 according to the request from the administration server 300.

According to the third embodiment explained above, the administration server 300 serving for the printers 100A to 100C acquires the ink information including the ink remaining ratios IR from those printers so as to determine the ink remaining ratios IR of the printers (the steps S200 and S205 of FIG. 6). The administration server 300 outputs the ink order information for ordering the cartridge for replacement at the order time determined by using the ink remaining ratio IR (sends the same to the supplier server 400: the step S235 of FIG. 6). The administration server 300 determines whether or not the cartridge for replacement is ordered (the step S110B of FIG. 12). The administration server 300 acquires the ink information at a shorter interval before the cartridge for replacement is ordered than after the cartridge for replacement is ordered. Therefore, before the cartridge for replacement is ordered, the administration server 300 determines the ink remaining ratio IR at a shorter interval than after the cartridge for replacement is ordered. As a result, it is possible to determine the time of ordering the cartridge for replacement at a good precision and, at the same time, to restrain the specification of needless ink remaining ratio IR after the cartridge for replacement is ordered. Especially, according to the third embodiment, because each time the ink remaining ratio IR is determined, the ink information request is sent to a printer, and the ink information is received from the printer, if needless specification of the ink remaining ratio IR is carried out at an excessive high frequency, then it is possible to overload the administration server 300 and each printer with the processes and overload the local area network NT and the Internet IT with the communications. However, according to the third embodiment, it is possible to restrain such disadvantages.

Further, because the administration server 300 carries out the ink related process for switching the set intervals (FIG. 12), it is possible to lessen the processing load on the printers 100A to 100C. Further, by changing only one computer program PG2 of the administration server 300 without changing the computer program PG1 of each of the printers 100A to 100C, it is possible to easily improve the ink related process such as adjusting the set intervals of "short", "medium" and "long".

As is understood from the above explanation, the ink order information in the third embodiment is an example of the printing material information. Further, the administration server 300 in the third embodiment is an example of the processing apparatus.

Modified Embodiments

In the first embodiment, after the cartridge for replacement is ordered, for example, during the period from the order time and date To1 to the delivery time and date Tt1 of FIG. 9, the set interval is set at "long". Instead of that, during the period from the order time and date To1 to the delivery time and date Tt1 of FIG. 9, it is possible to stop determining the ink remaining ratio IR and/or stop sending the ink information to the administration server 300. In other words, after the cartridge for replacement is ordered, the ink remaining ratio IR may not be determined and/or the ink information may not be sent until a restart condition is satisfied. The restart condition may be the fact that the cartridge for replacement is delivered, or the fact that the ink cartridge is replaced. According to such a modified embodiment, after the cartridge for replacement is ordered, needless specification of the ink remaining ratio IR and/or needless transmission of the ink information are/is further restrained.

In the first embodiment, the three steps "short", "medium" and "long" of the set interval are used. However, for example, the two steps "short" and "long" of the set interval may be used. For example, in FIG. 9, during the periods from the replacement time and date Tr1 to the order time and date To1 and from the replacement time and date Tr2 to the order time and date To2, the set interval may be set at "short", whereas during the period from the order time and date To1 to the replacement time and date Tr2, the set interval may be set at "long".

In the second embodiment, the "short", "long" and "infinitely long" set intervals are used. However, the "short", "medium" and "long" three steps of the set interval may be used. For example, in FIG. 11, during the periods from the replacement time and date Tr1 to the order time and date To1 and from the replacement time and date Tr2 to the order time and date To2, the set interval may be set at "short"; during the periods from the order time and date To1 to the empty time and date Te1 and from the order time and date To2 to the empty time and date Te2, the set interval may be set at "medium"; and during the period from the empty time and date Te1 to the replacement time and date Tr2, the set interval may be set at "long".

In the above respective embodiments, during the periods from the replacement time and date Tr1 to the order time and date To1 and from the replacement time and date Tr2 to the order time and date To2, the set interval is set at "short". Instead of that, during the period from the replacement time and date Tr1 to the time when the remaining amount of the target cartridge is halved, the set interval may be set at "long", whereas from the time when the remaining amount of the target cartridge is halved to the order time and date To1, the set interval may be set at "short". At least before and after the order time and date To1 or the order time and date To2, it is preferable to switch the set interval from a comparatively short one to a comparatively long one.

In the first and second embodiments, sending the ink information to the administration server 300 and determining the ink remaining ratio IR are both carried out according to each set interval. Instead of that, the ink remaining ratio IR may be determined at such a frequency having nothing to do with sending the ink information. For example, the ink remaining ratio IR may be determined for each print. In this case, only the ink information is sent to the administration server 300 at each set interval.

In the above embodiments, the ink remaining ratio IR is included in the ink information as a value related to the remaining amount of the ink Ik. However, instead of the ink remaining ratio IR, another value related to the remaining amount of the ink Ik may be included. For example, a physical quantity (in milliliters, for example) of the ink Ik included in the ink cartridge 200A, or a value converting the amount of the ink Ik into the number of printing dots may be taken as a value related to the remaining amount of the ink Ik.

In the above embodiments, the printing material is resupplied by way of replacing the cartridge. Instead of that, the printing material may be resupplied by way of resupplying the ink directly to an ink container included in the printer 100A. Further, if the printer 100A includes an electrophotographic printing unit such as a laser printer, then the printing material may be resupplied by replacing the toner cartridge or resupplying the toner.

In the above embodiments, the information database IB is referred to for determining the ink remaining ratio IR (such as the step S135 of FIG. 5). Instead of that, the value related to the remaining amount of the printing material such as the ink remaining ratio IR and the like may be determined by another method. For example, the remaining amount of the printing material such as the ink Ik, the toner or the like may be measured physically and, based on the measured result, the value related to the remaining amount of the printing material such as the ink remaining ratio IR and the like may be determined. For example, if the printer 100A includes an electrophotographic printing unit, the remaining amount of the toner may be measured, for example, by using a method or the like based on a voltage value acquired from an electrode included in the toner cartridge, to determine the value related to the remaining amount of the toner. In this case, due to the measurement of the remaining amount of the toner, the photoreceptor and/or the toner may be consumed but, by applying the above embodiments, it is possible to restrain the frequency of determining the value related to the remaining amount of the toner and restrain the frequency of measuring the remaining amount of the toner. As a result, it is possible to restrain the consumption of the photoreceptor and/or the toner due to the measurement of the remaining amount of the toner.

In the first embodiment, the printer 100A determines whether or not the cartridge for replacement is prepared for up to the ordered step (the step S120 of FIG. 5). Instead of that, the printer 100A may determine whether or not the cartridge for replacement is prepared for up to another step. For example, the printer 100A may determine whether or not the cartridge for replacement is brought up to such a step as on the way of delivery from the shop to the user, or determine whether or not the cartridge for replacement is brought up to such a step as departed from the manufacturer.

In the second embodiment, the administration server 300 determines the order time and date To1 of the cartridge for replacement. Instead of that, the printer 100A may determine the ink remaining ratio IR at each set interval, determine the order time and date To1 of the cartridge for replacement by using that ink remaining ratio IR, and order the cartridge for replacement (send the ink order information to the supplier server 400). In this case, the printer 100A sets the set interval in the same manner as in the first embodiment. In this case, the administration server 300 may be unprovided. In this case, the printer 100A is an example of the processing apparatus.

In the first and second embodiments, outputting the ink information is sending the ink information to the administration server 300 (the step S140 of FIGS. 5 and 10). Instead of that, the ink information may be outputted by displaying the ink information on the display 140 or causing the print unit 170A to print the ink information. In this case, for example, the user confirms the ink information, uses the ink remaining ratio IR included in the ink information to determine the time of ordering the cartridge for replacement, and orders the cartridge for replacement. Further, in the above embodiments, outputting the ink order information is sending the ink order information to the supplier server 400 (the step S235 of FIG. 6 and the step S10 of FIG. 8). Instead of that, the ink order information may be outputted by displaying the ink order information on a display of the administration server 300 (such as a liquid crystal display). In this case, for example, the operator of the administration server 300 may arrange the delivery of the cartridge for replacement.

Although the administration server 300 is connected to the Internet IT in the above embodiments, the administration server 300 may instead be connected to the local area network NT. Further, the administration server 300 may be a so-called cloud server including a number of computers capable of mutual communication via a network.

In the first and second embodiments, each of the printers 100A to 100C carries out the ink related process of FIGS. 5 and 10. Instead of that, the ink related process of FIG. 5 may be carried out by a computer (such as a local server) connected to the local area network NT, for example. In this case, the computer carries out the ink related process independently according to each of the ink cartridges of CMYK of the printers 100A to 100C. In the step S135 of FIGS. 5 and 10, by inquiring to the printers 100A to 100C, the computer determines the ink remaining ratio IR and the number of replacements in each printer and, in the step S140, sends the ink information including the above information to the administration server 300. In this case, the computer connected to the local area network NT is an example of the processing apparatus.

In the above embodiments, the printer 100A includes the print unit 170A of the dual-chamber supply method having the intermediate container 175A. Instead of that, the printer 100A may include the print unit 170A of a single-chamber supply method without the intermediate container 175A.

In the above embodiments, part of the configuration realized by hardware may be replaced by software or, conversely, part or the whole of the configuration realized by software may be replaced by hardware.

If the function of the present invention is realized partially or entirely by computer programs, then it is possible to provide the programs in the form of being stored in a computer readable recording medium (such as a non-transitory recording medium). The programs are usable in the state of being stored in an identical to or different from the recording medium (such as a computer readable recording medium) when provided. The term "computer readable recording medium" is not limited to portable recording media such as memory cards and CD-ROMs, but may include internal storage devices in a computer such as various kinds of ROMs, or external storage devices connected to the computer such as hard disks and the like.

Hereinabove, the present invention was made based on the embodiments and modified embodiments. However, those described embodiments of the present invention are intended to serve for making it easy to understand the present invention but not to limit the present invention. The present invention may be changed and/or refined and may include all equivalents without departing from the true spirit thereof and the scope set forth in the appended claims.

What is claimed is:

1. A processing apparatus for a print unit configured to print an image by using a printing material, the processing apparatus comprising:
   a processor configured to:
      determine a value related to a remaining amount of the printing material in the print unit;
      periodically output printing material information based on the determined value related to the remaining amount; and
      judge whether a replenishment printing material to be supplied to the print unit is ordered,
   wherein the processor is further configured to output the printing material information at a shorter periodic interval before the replenishment printing material is ordered than after the replenishment printing material is ordered.

2. The processing apparatus according to claim 1, wherein the processor is configured to determine the value related to the remaining amount of the printing material at a point of time when the time comes to output the printing material information, and output the printing material information by using the determined value related to the remaining amount at the point of time when the time comes to output the printing material information.

3. The processing apparatus according to claim 1, wherein the processor is further configured to detect that the printing material is supplied to the print unit after the replenishment printing material is ordered, and periodically output the printing material information at the same periodic interval after the replenishment printing material is supplied as before the replenishment printing material is ordered.

4. The processing apparatus according to claim 1, wherein the processor is configured not to output the printing material information after the replenishment printing material is ordered, until a restart condition in relation to the replenishment printing material is satisfied.

5. The processing apparatus according to claim 1,
   wherein the processor is further configured to:
      acquire condition information related to a condition of preparing for the ordered printing material after the replenishment printing material is ordered; and
      determine whether the replenishment printing material is prepared for up to a predetermined step by using the condition information, and
   the processor is configured to periodically output the printing material information at a shorter periodic interval after the replenishment printing material is prepared for up to the predetermined step than after the replenishment printing material is ordered and before the replenishment printing material is prepared for up to the predetermined step.

6. The processing apparatus according to claim 1,
   wherein the print unit includes a first cartridge configured to contain the printing material, a printing mechanism configured to execute printing by using the printing material contained in the first cartridge, and a container arranged in a passage for the printing material from the first cartridge to the printing mechanism,
   the judging whether the replenishment printing material to be supplied to the print unit is ordered includes judging whether a second cartridge to be replaced with the first cartridge is ordered,
   a remaining state of the printing material in the print unit includes:
      a first state where the printing material remains in the first cartridge and also remains in the container; and
      a second state where the printing material does not remain in the first cartridge but remains in the container,
   the processor is further configured to determine whether the remaining state of the printing material in the print unit has changed from the first state to the second state after the replenishment printing material is ordered, and
   the processor is configured to:
      periodically output the printing material information at a first periodic interval before the replenishment printing material is ordered;

periodically output the printing material information at a second periodic interval being longer than the first periodic interval after the replenishment printing material is ordered and before the remaining state of the printing material in the print unit changes from the first state to the second state, and stop outputting the printing material information after the remaining state of the printing material of the print unit has changed from the first state to the second state.

7. The processing apparatus according to claim 1, wherein the processor is configured to determine the value related to the remaining amount at a shorter periodic interval before the replenishment printing material is ordered than after the replenishment printing material is ordered.

8. The processing apparatus according to claim 7,
wherein the processor is further configured to detect that the printing material is resupplied to the print unit after the replenishment printing material is ordered, and
the processor is configured to determine the value related to the remaining amount at the same periodic interval after the printing material is replenished as before the replenishment printing material is ordered.

9. The processing apparatus according to claim 7, wherein the processor is configured not to determine the value related to the remaining amount after the replenishment printing material is ordered, until a restart condition is satisfied in relation to the replenishment printing material.

10. The processing apparatus according to claim 7,
wherein the processor is further configured to:
acquire condition information related to a condition of preparing for the ordered printing material after the replenishment printing material is ordered; and
determine whether the replenishment printing material is prepared for up to a predetermined step by using the condition information, and
the processor is configured to determine the value related to the remaining amount at a shorter periodic interval after the replenishment printing material is prepared for up to the predetermined step than after the replenishment printing material is ordered and before the replenishment printing material is prepared for up to the predetermined step.

11. The processing apparatus according to claim 7,
wherein the print unit includes: a first cartridge configured to contain the printing material; a printing mechanism configured to execute printing by using the printing material contained in the first cartridge; and a container arranged in a passage for the printing material from the first cartridge to the printing mechanism,
the judging whether the replenishment printing material to be supplied to the print unit is ordered includes judging whether a second cartridge to be replaced with the first cartridge is ordered,
a remaining state of the printing material in the print unit includes:
a first state where the printing material remains in the first cartridge and also remains in the container; and
a second state where the printing material does not remain in the first cartridge but remains in the container,
the processor is further configured to determine whether the remaining state of the printing material of the print unit has changed from the first state to the second state after the replenishment printing material is ordered, and
the processor is configured to:

determine the value related to the remaining amount at a first periodic interval before the replenishment printing material is ordered,
determine the value related to the remaining amount at a second periodic interval being longer than the first periodic interval after the replenishment printing material is ordered and before the remaining state of the printing material in the print unit changes from the first state to the second state, and
stop determining the value related to the remaining amount after the remaining state of the printing material in the print unit has changed from the first state to the second state.

12. The processing apparatus according to claim 1, further comprising an interface connected to a network,
wherein the processor is configured to output the printing material information to an external device connected via the network.

13. The processing apparatus according to claim 1, further comprising the print unit.

14. The processing apparatus according to claim 7, further comprising an interface connected to a network,
wherein the processor is configured to:
request a value related to a remaining amount of the printing material in the print unit connected via the network;
determine the value related to the remaining amount of the printing material by acquiring the value related to the remaining amount of the printing material from the print unit as a response to the request; and
output the printing material information at the order time determined by using the determined value related to the remaining amount of the printing material, and
the printing material information is order information of ordering the replenishment printing material.

15. A non-transitory computer-readable medium storing a program that is executable by a processing apparatus and that is for a print unit configured to print an image by using a printing material, the program, when executed by a processor of the processing apparatus, causing the processing apparatus to:
determine a value related to a remaining amount of the printing material in the print unit;
periodically output printing material information based on the determined value related to the remaining amount; and
determine whether a replenishment printing material to be supplied to the print unit is ordered,
wherein the program causes the processing apparatus to:
determine an order time to order the replenishment printing material by using the determined value related to the remaining amount of the printing material; and
output the printing material information at a shorter periodic interval before the replenishment printing material is ordered than after the replenishment printing material is ordered.

16. The non-transitory computer-readable medium according to claim 15, wherein the program causes the processing apparatus to determine the value related to the remaining amount at a shorter periodic interval before the replenishment printing material is ordered than after the replenishment printing material is ordered.

17. A system for ordering a printing material, the system comprising:

a printer having a print unit configured to print an image by using the printing material; and a first server connected to the printer via a network, wherein the printer includes a first processor configured to:

determine a value related to a remaining amount of the printing material in the print unit;

send printing material information based on the determined value related to the remaining amount to the first server via the network; and determine whether a replenishment printing material to be supplied to the print unit is ordered, the first server includes a second processor configured to:

send order information of the replenishment printing material based on the printing material information to the second server via the network, when receiving the printing material information sent from the printer; and send a notice of order to the printer via the network to notify that the order information of the replenishment printing material is already sent to the second server, and the first processor is configured to:

determine an order time to order the replenishment printing material by using the value related to the remaining amount of the printing material; and send the printing material information to the first server at a shorter periodic interval before the replenishment printing material is ordered than after the replenishment printing material is ordered.

* * * * *

UNITED STATES PATENT AND TRADEMARK OFFICE
CERTIFICATE OF CORRECTION

PATENT NO. : 11,023,193 B2  
APPLICATION NO. : 16/716764  
DATED : June 1, 2021  
INVENTOR(S) : Masafumi Miyazawa Page 1 of 1

It is certified that error appears in the above-identified patent and that said Letters Patent is hereby corrected as shown below:

In the Claims

Column 26, Claim 6, Line 51 should read:
whether a second cartridge to replace the first Column 27, Claim 11, Line 54 should read:
whether a second cartridge to replace the first Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*